United States Patent [19]

Beckett

[11] 4,236,581
[45] Dec. 2, 1980

[54] HARVESTING MACHINE

[76] Inventor: Joseph E. Beckett, 4201 Bonita Rd. #140, Bonita, Calif. 92002

[21] Appl. No.: 848,762

[22] Filed: Nov. 4, 1977

[51] Int. Cl.$^3$ ............................................ A01D 25/04
[52] U.S. Cl. ................................... 171/56; 56/121.42; 56/328 R
[58] Field of Search ........... 171/56; 56/330 R, 328 R, 56/121.4, 121.42, 121.44; 47/67, 56; 99/517

[56] References Cited

U.S. PATENT DOCUMENTS

| | | | |
|---|---|---|---|
| 851,170 | 4/1907 | Israel | 47/56 X |
| 1,207,889 | 12/1916 | Fletcher | 171/56 |
| 1,476,945 | 12/1923 | Beale | 171/56 |
| 1,787,026 | 12/1930 | Verhoff | 171/56 |
| 1,878,349 | 9/1932 | Terada | 56/121.42 |
| 1,914,621 | 6/1933 | Siemann | 171/56 |
| 2,637,964 | 5/1953 | Orendorff | 56/121.44 |
| 3,276,194 | 10/1966 | Mohn et al. | 56/DIG. 2 |
| 3,308,890 | 3/1967 | Rhode | 56/121.42 |
| 3,324,786 | 6/1967 | Geiser et al. | 99/517 |
| 3,507,101 | 4/1970 | Bernshausen | 56/328 R |

FOREIGN PATENT DOCUMENTS 1582472 6/1970 Fed. Rep. of Germany ........ 56/121.44

Primary Examiner—Paul J. Hirsch
Attorney, Agent, or Firm—Boniard I. Brown

[57] ABSTRACT

A harvesting machine for root row crops, such as onions, radishes, parsley, turnips, turnip greens, carrots, and the like wherein the individual plants have root bodies within the soil and tops above the ground. The harvesting machine has at least one harvesting wheel mounted on a vehicle for movement along a plant row and provided about its perimeter with a pair of annular, axially confronting plant top gripping means which open and close locally as the wheel turns, in a manner such that the gripping means open within a plant receiving zone within the bottom of the wheel to receive between the gripping means the tops of the plants in the plant row being harvested, and the gripping means then close to grip the intervening plant tops, extract the plants from the ground, and transport the extracted plants upwardly through a transfer zone to an upper plant releasing zone, where the gripping means reopen to release the plants from the wheel. Plant treatment means may be arranged about the wheel perimeter for washing, trimming, brushing, and/or chilling the harvested plants during their transit from the plant receiving zone to the plant releasing zone of the harvesting wheel. The harvested plants may be released in groups from the harvesting wheel for bundling in bunches by a worker positioned on the vehicle adjacent the harvesting wheel. Alternatively, the plants may discharge from the wheel into a plant receiver equipped with a trimmer for trimming the tops from the plants. The described, presently preferred embodiment of the harvesting machine has a plurality of harvesting wheels for simultaneously harvesting the plants in a plurality of adjacent plant rows and seeding means for immediately reseeding the plant rows.

34 Claims, 29 Drawing Figures

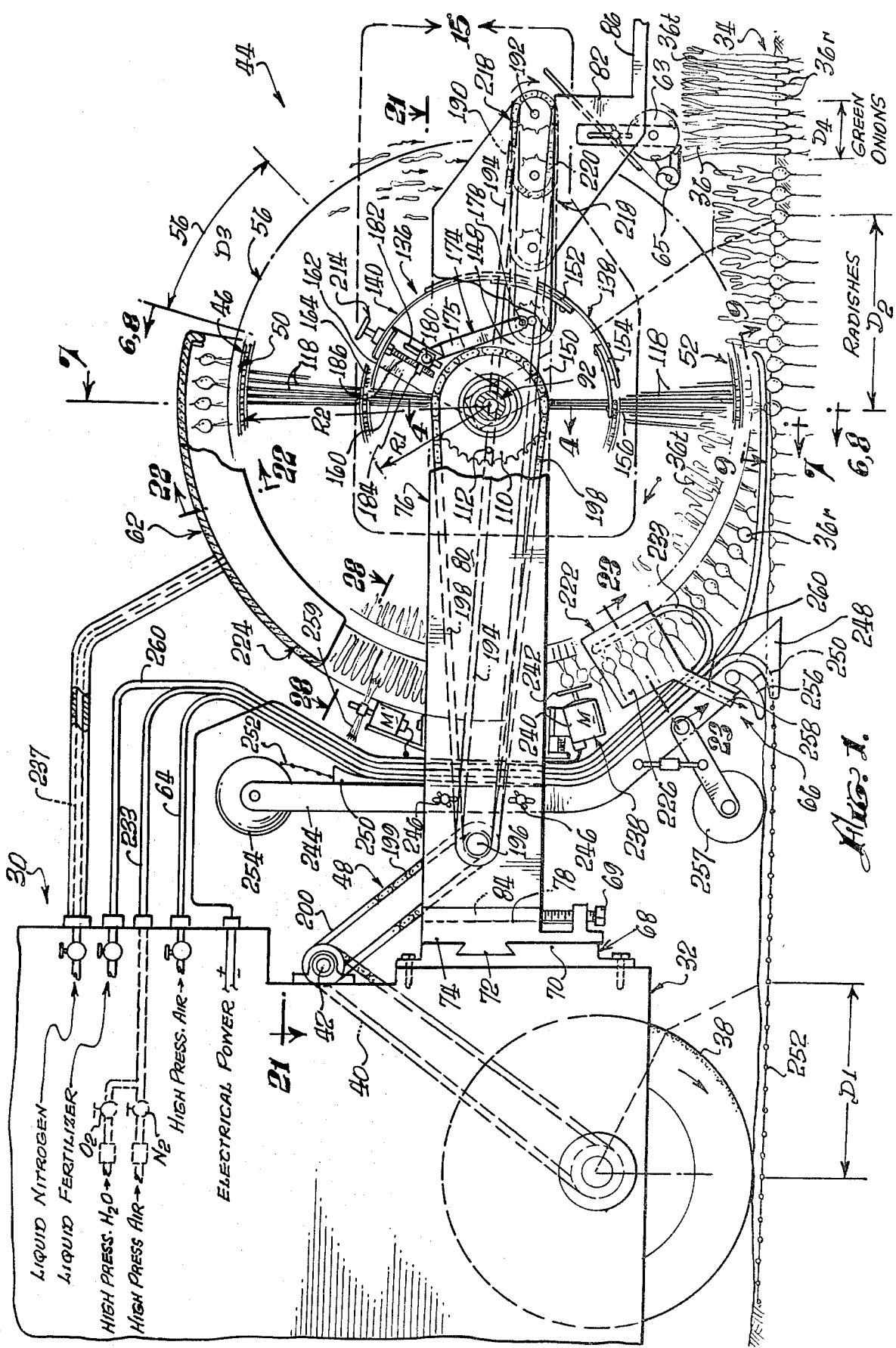

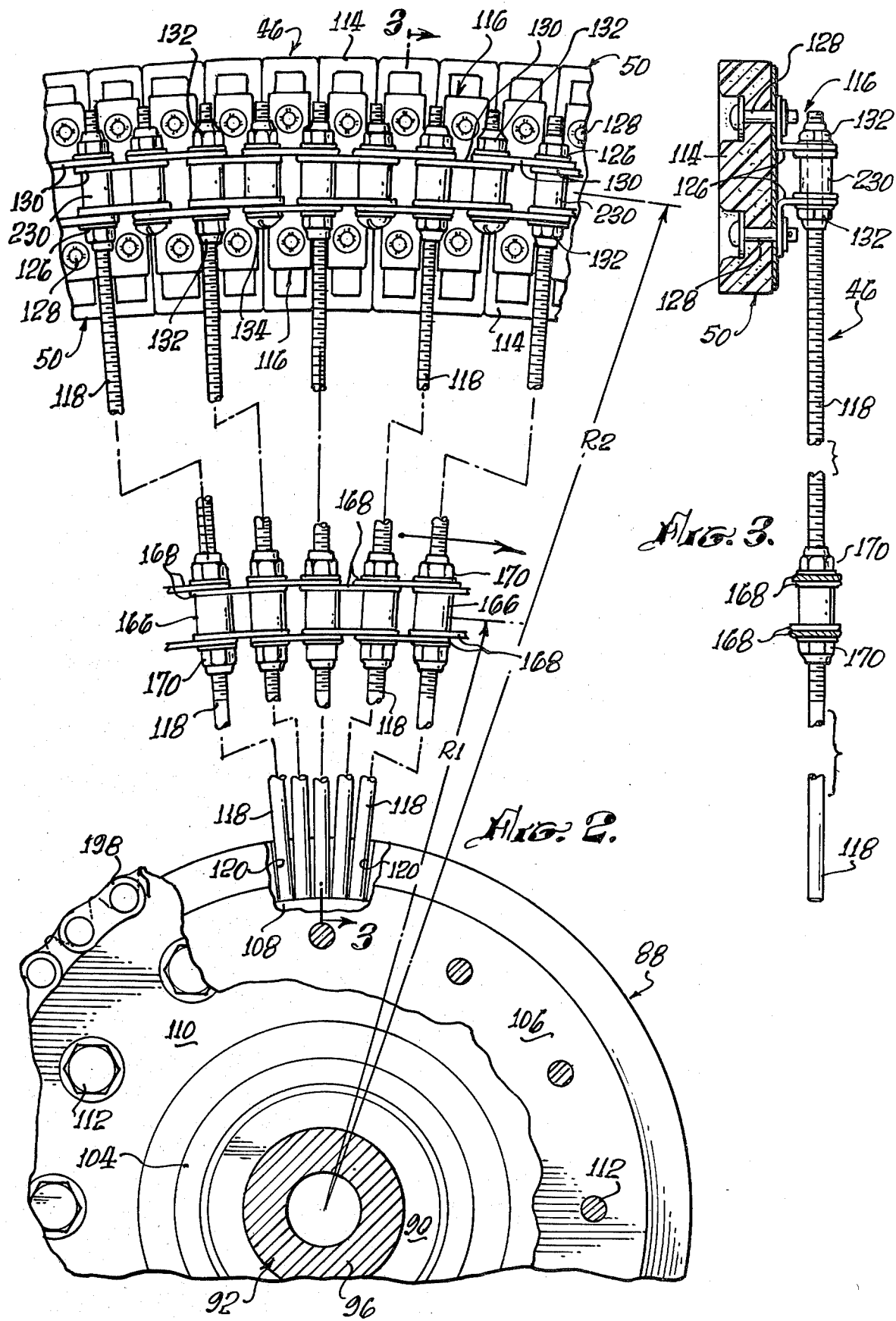

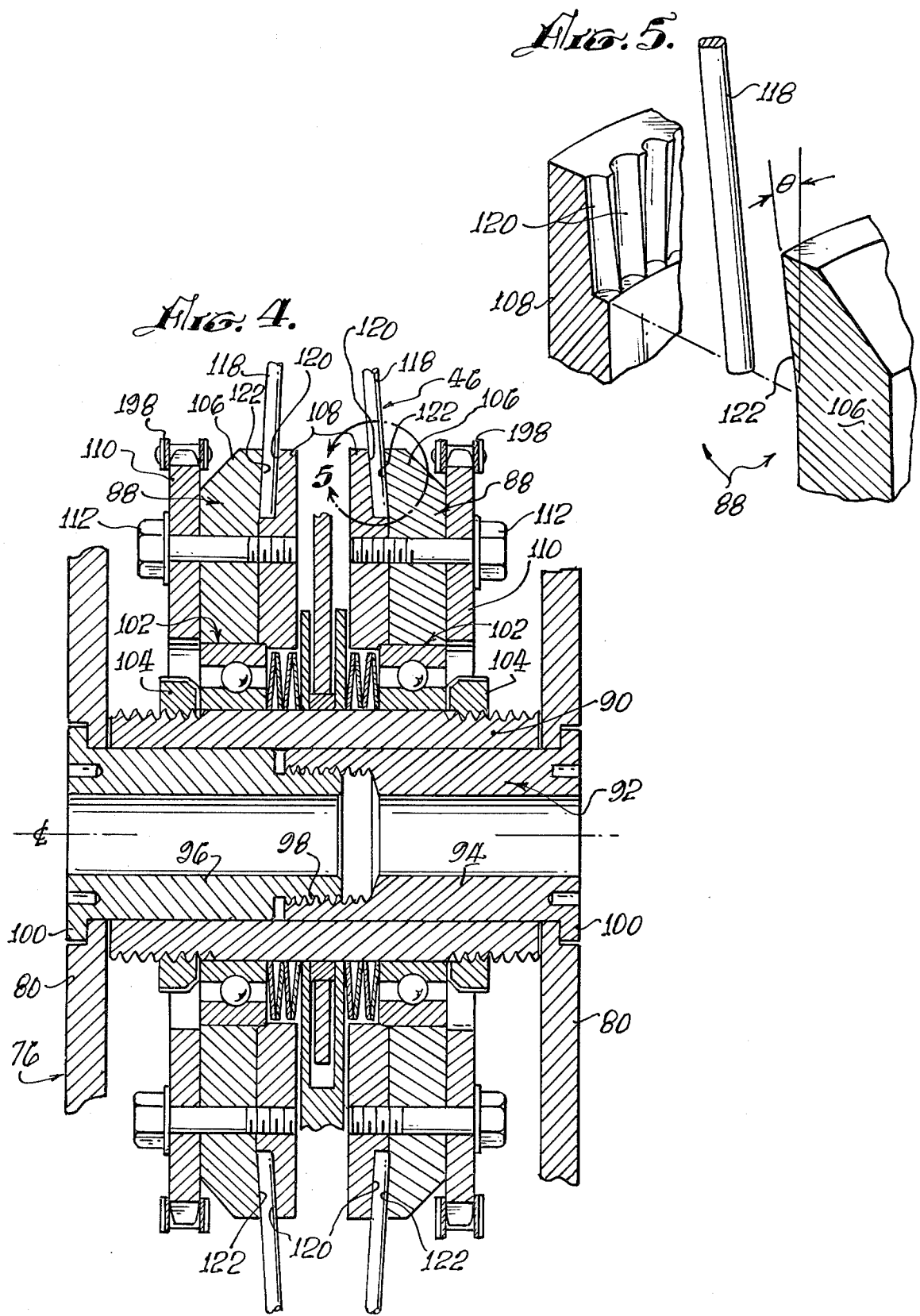

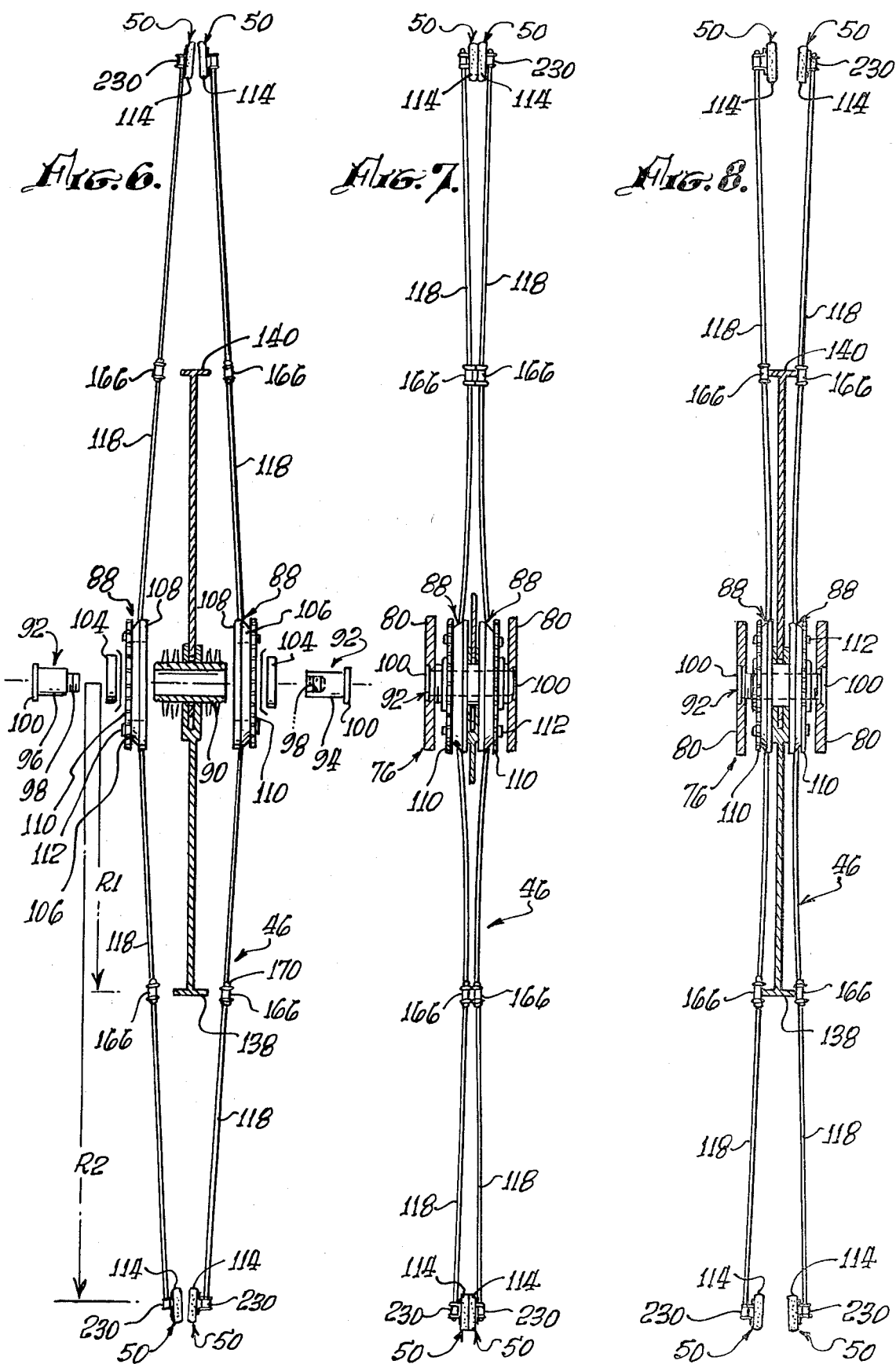

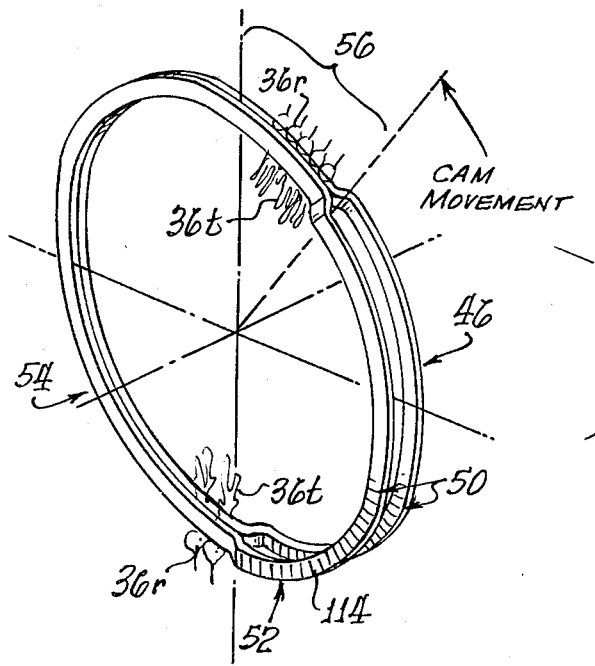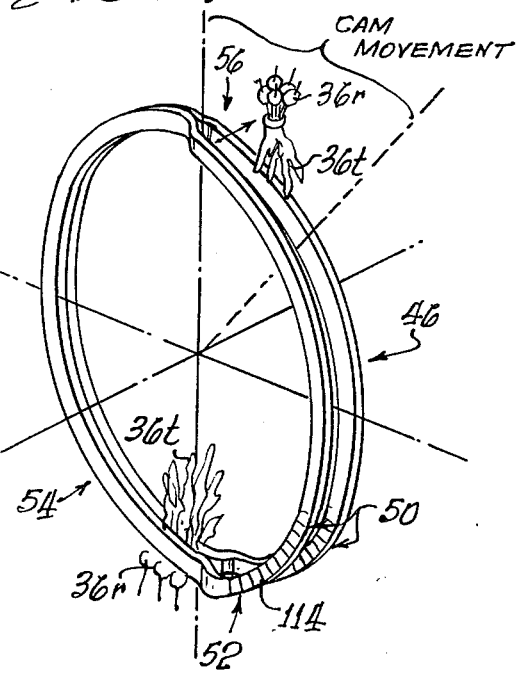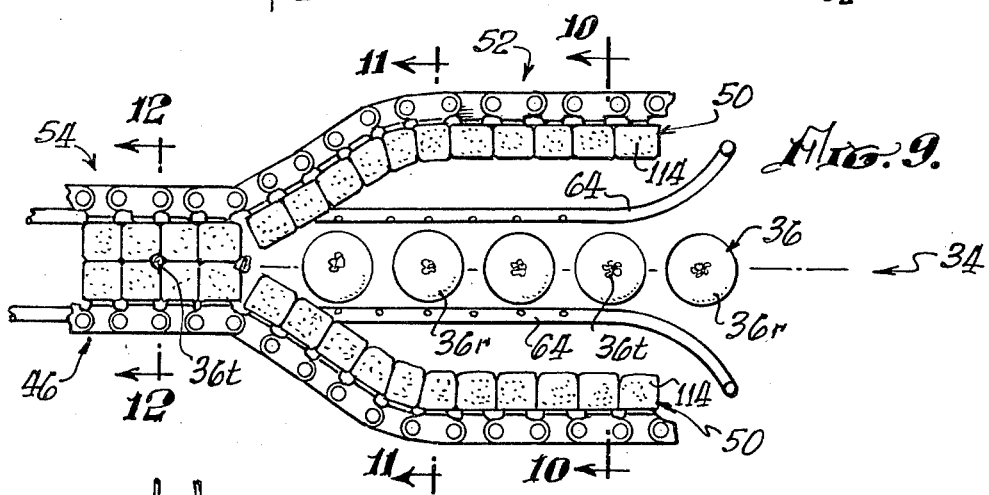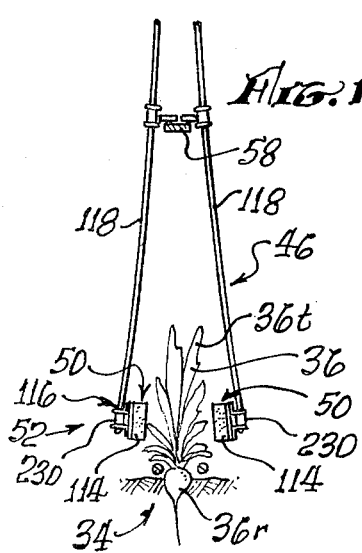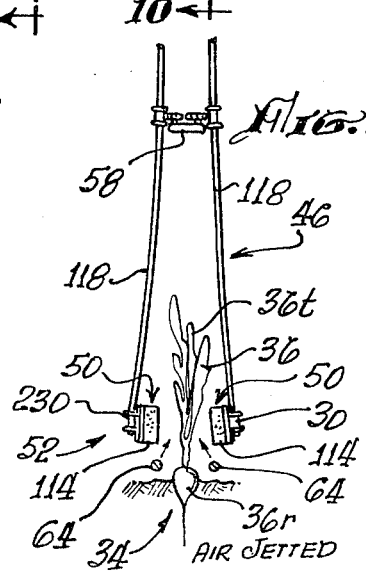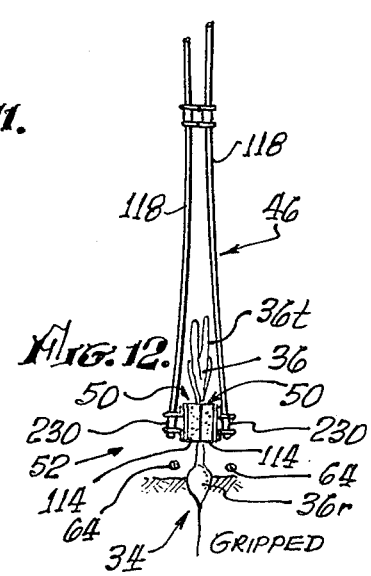

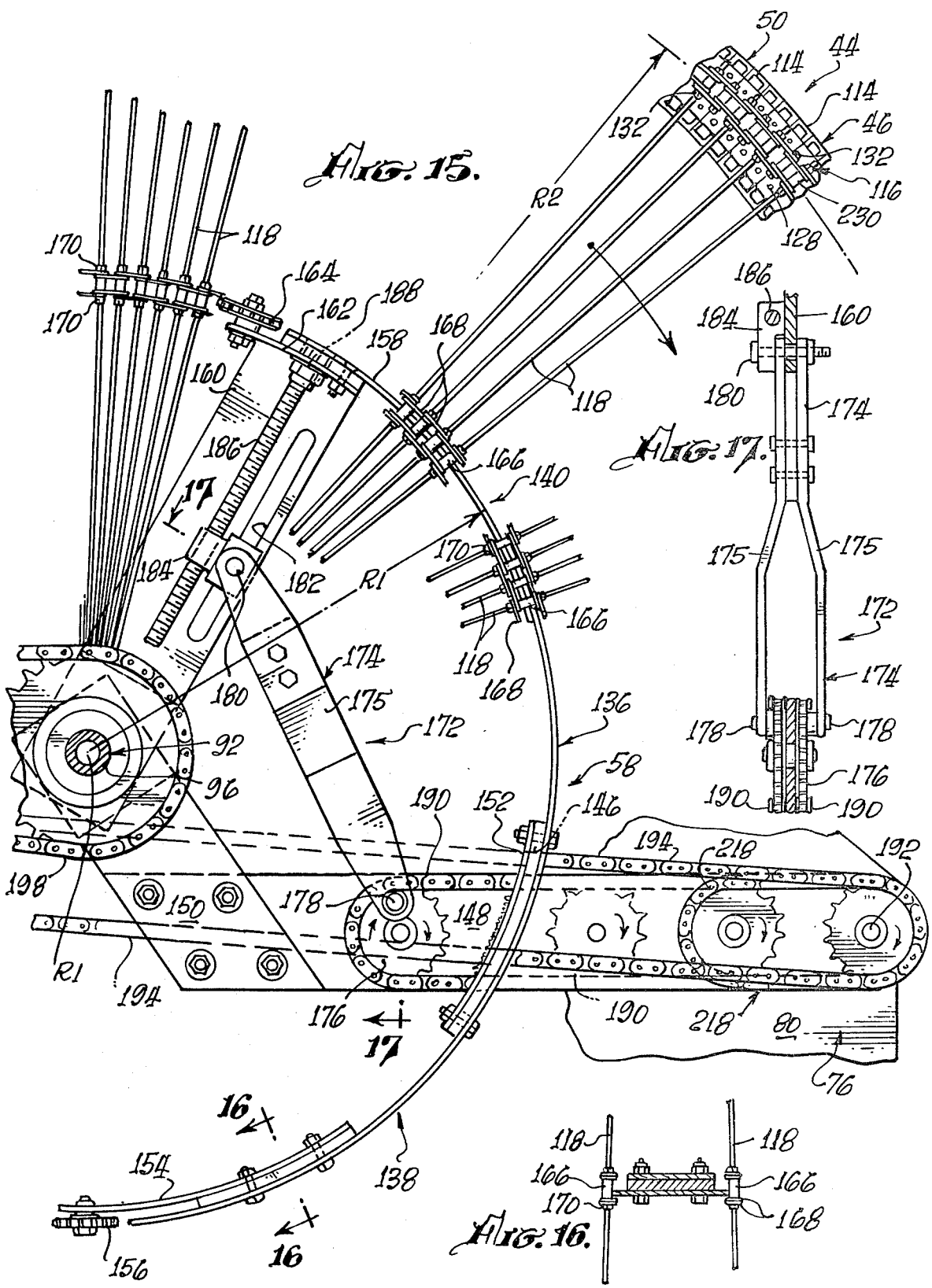

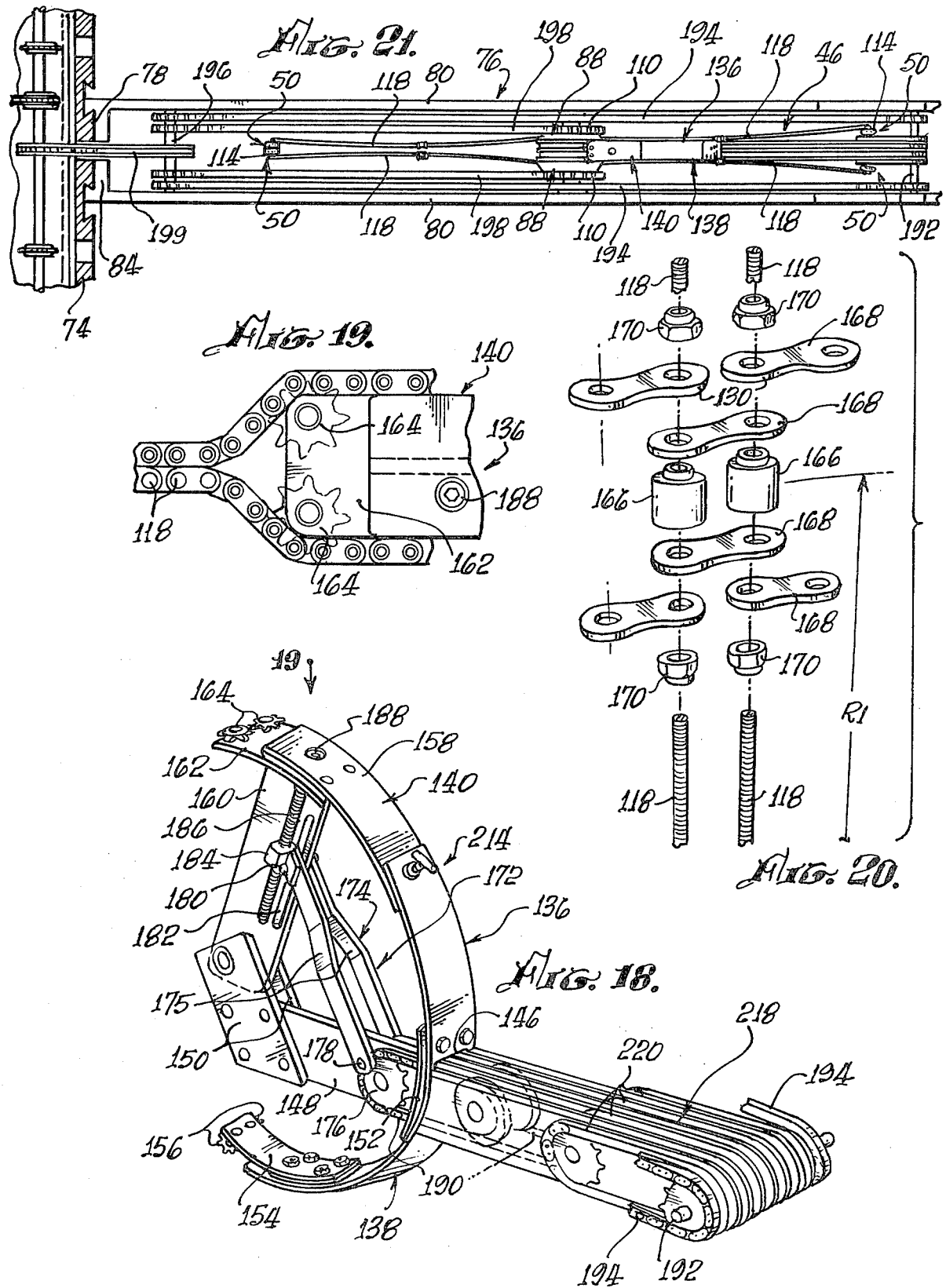

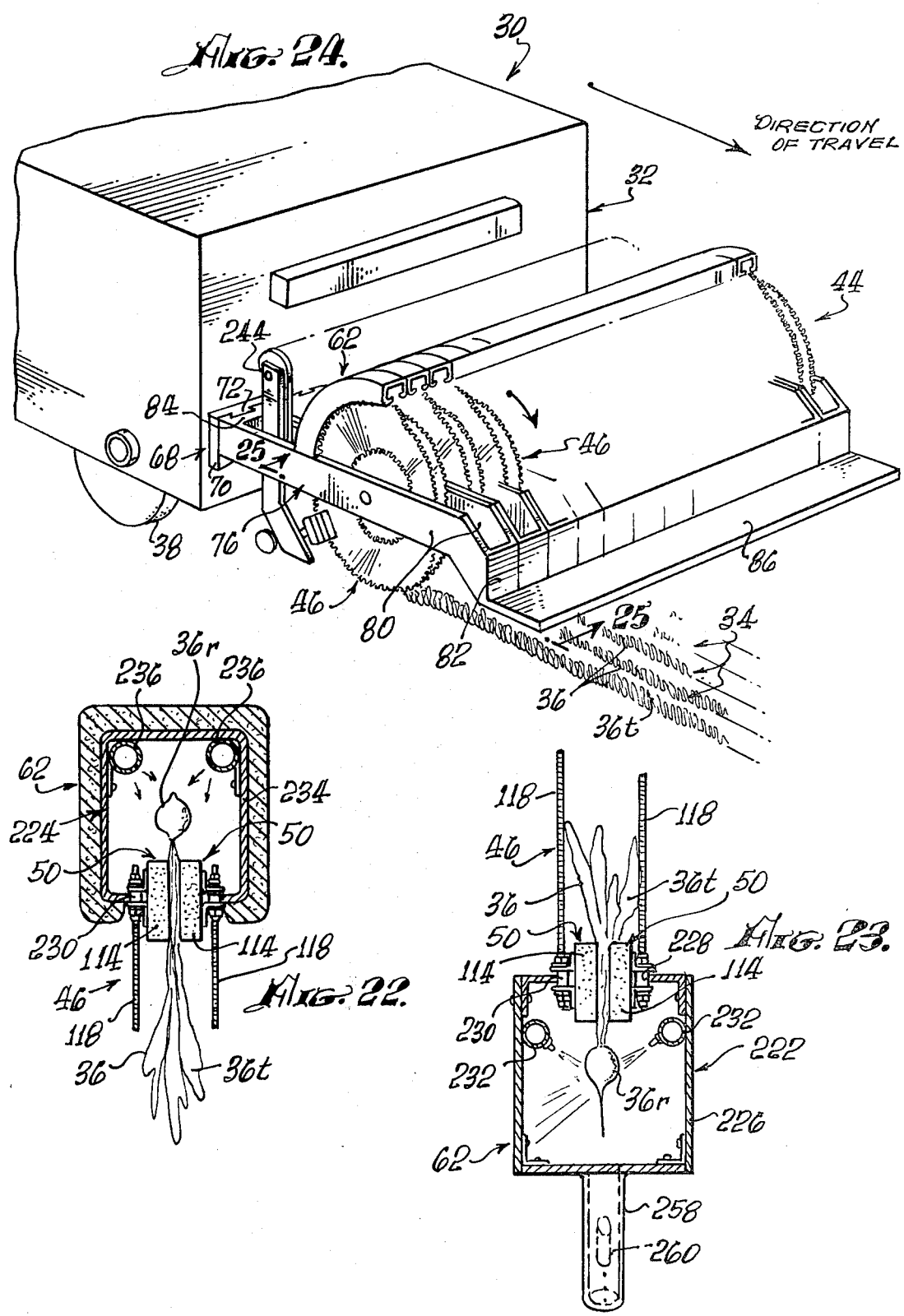

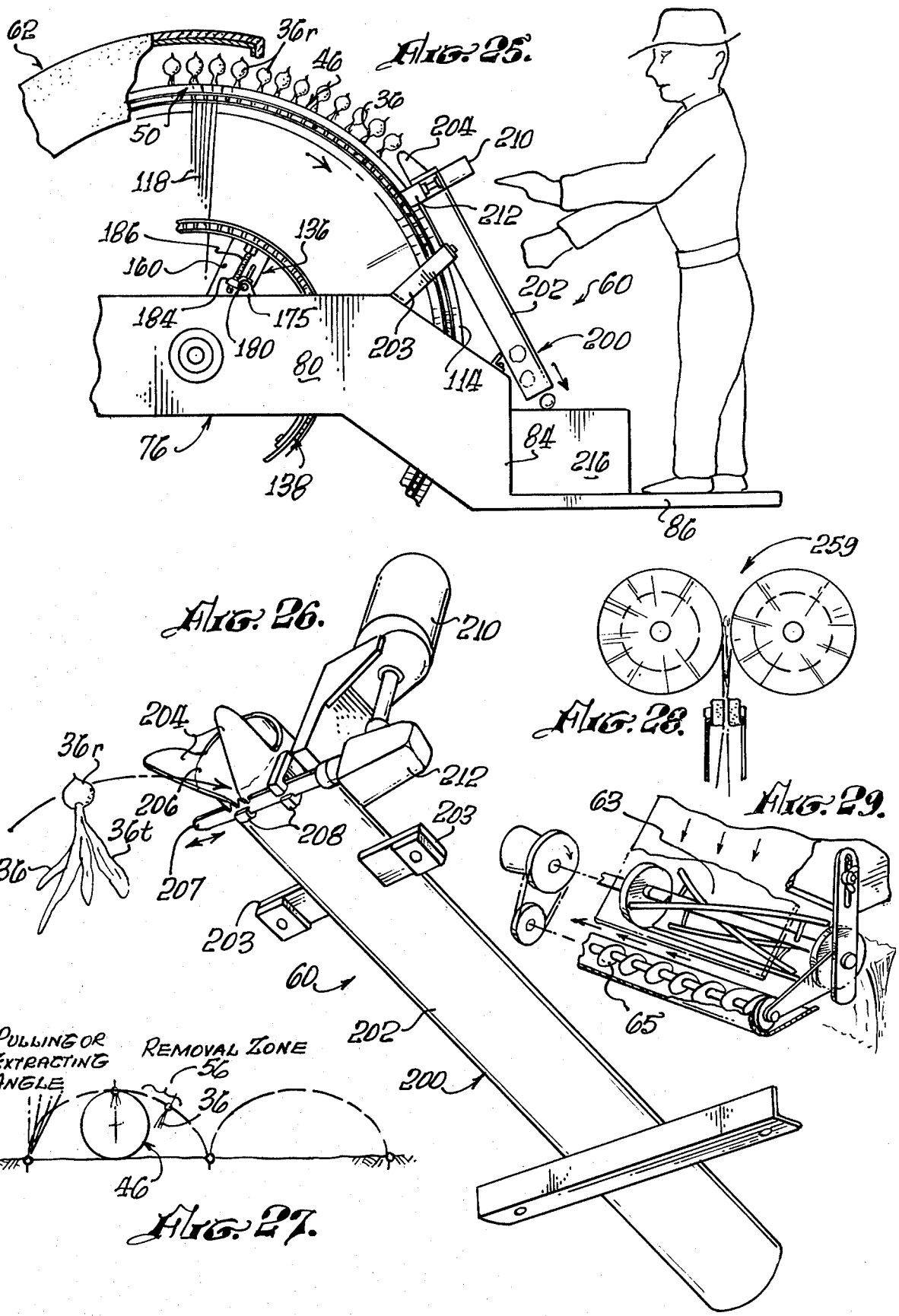

HARVESTING MACHINE

BACKGROUND OF THE INVENTION

1. Field of the Invention

This invention relates generally to agricultural equipment and more particularly to an improved machine for harvesting root row crops.

2. Prior Art

One class of edible crops, referred to herein as root row crops, comprise individual plants having edible root portions or bottoms within the soil or edible top portions above the ground. Common examples of such root row crops having edible roots are onions, radishes, turnips, beets, carrots, and the like. Common examples of root row crops having edible tops are parsely, turnip greens, mustard greens, and the like. Crops of this type are harvested by extracting the entire plants from the soil and, in some cases, trimming off nonedible portions of the plants.

A variety of harvesting machines have been devised for harvesting such root row crops. Examples of such machines are described in U.S. Pat. Nos. 2,956,628, 3,721,301, 3,578,088, 3,548,951. Harvesting machines for such root row crops are also marketed throughout the world by a number of different companies. By way of example, one popular radish harvesting machine of this kind, known as a radish topper and combine, is marketed by Tawco Products Incorporated, Columbus, Ohio.

The existing root row crop harvesting machines are deficient in certain respects and it is the primary object of this invention to provide a harvesting machine which avoids these deficiencies. A major deficiency of most if not all of the existing harvesting machines, for example, involves the plant row spacing for which the machines are designed. Thus, stated in broad terms, a multiple plant row harvesting machine comprises a vehicle movable along the plant rows and a number of individual harvesting units mounted side by side on the vehicle for movement with the vehicle along a corresponding number of adjacent plant rows to be harvested. The spacing between centers of the adjacent plant rows obviously must conform to the center spacing of these harvesting units. In the case of most if not all root row crops of the character described, it is advantageous, in order to maximize crop production, to make the plant row spacing as small as possible. The minimum plant row spacing, of course, is determined by the minimum spacing of the harvesting units on the harvesting machine.

In the case of the existing root row crop harvesting machines, the minimum spacing between adjacent harvesting units of the machine is relatively large. By way of example, the center spacing between adjacent harvesting units of the Tawco radish harvesting machine referred to above is 9". This dimension sets a minimum 9" spacing between the adjacent radish plant rows. In contrast, the improved root row harvesting machine of this invention may be constructed with a 3" spacing between the adjacent plant row harvesting units. The present harvesting machine, therefore, effectively permits a three-fold increase in the yield of a given radish field, as compared to the yield which may be obtained with the existing radish harvesting machine. The harvesting machine of the present invention possesses other unique advantages and features of construction, as will appear from the ensuing description.

SUMMARY OF THE INVENTION

The root row crop harvesting machine of the invention has a vehicle movable along the plant rows to be harvested and including at least one and preferably several plant row harvesting units mounted side by side for movement with the vehicle along a corresponding number of adjacent plant rows. Each of these harvesting units comprises a harvesting wheel of unique construction and operation and constitutes a major contribution of the present invention.

Each harvesting wheel is mounted on the harvesting vehicle in normally generally vertical longitudinal plane of the vehicle for movement with the vehicle along an individual plant row and with the bottom of the wheel located at the level of the plant tops in the row. About the perimeter of the harvesting wheel are a pair of annular, axially confronting plant gripping means which are relatively movable locally toward one another to closed plant top gripping positions and away from one another to open plant releasing positions. The harvesting wheel is driven in rotation in timed relation to movement of the harvesting vehicle along the plant rows being harvested, in a manner such that each point on the perimeter of the wheel follows a path conforming approximately to a cycloid, preferably a common cycloid, relative to the ground. During each revolution of the harvesting wheel, each point on the perimeter of the wheel rotates in succession through a plant receiving zone at the bottom of the wheel, then upwardly through a transfer zone to an upper plant releasing zone, and then through this plant releasing zone back to the bottom plant receiving zone.

Associated with the harvesting wheel are means for effecting local opening and closing movement of the plant gripping means in timed relation to rotation of the wheel in a manner such that the gripping means rotate through the bottom receiving zone in open position to receive therebetween the tops of the plants in the corresponding plant row and the gripping means then close upon entering the following transfer zone to grip the intervening plant tops, extract the gripped plants from the soil, and transport the extracted plants upwardly through the transfer zone to the plant releasing zone. Upon entering this plant releasing zone, the gripping means reopen to release the extracted plants from the harvesting wheel.

In the described, preferred harvesting machine of the invention, the plant gripping means of the harvesting wheel comprise two circular rows of opposing plant top gripping elements, preferably resilient gripping pads, about the wheel perimeter. The gripping elements in each row are disposed side by side in close proximity to one another so as to form, in effect, a continuous circular band-like plant gripping structure. These gripping elements are mounted on the outer ends of flexible, radially extending spokes whose inner ends are fixed to the hub of the harvesting wheel in a manner such that the opposing gripping elements are independently movable toward one another to their closed plant gripping positions and away from one another to their open plant releasing positions by flexing of the spokes. These spokes are stressed to bias the gripping elements to their closed plant gripping position. Between the spokes for the two rows of gripping elements are cam means which engage the spokes to retain the gripping elements in their open position within the plant gripping and releasing zones of the harvesting wheel and permit elastic strain energy in the spokes to retain the gripping elements in their closed positions within the transfer zone of the harvesting wheel.

According to a feature of the invention mentioned above, the cam means of the harvesting wheel includes a fixed cam which retains the plant gripping elements of the wheel in their open positions within the lower plant receiving zone of the wheel and an oscillatory cam which retains the gripping elements open within the upper plant releasing zone of the wheel. This oscillatory cam is driven in oscillation circumferentially of the harvesting wheel in timed relation to rotation of the wheel in such a way as to effect opening of the gripping elements at the plant releasing zone in successive groups and, thereby, release of harvested plants from the wheel in groups for bundling of the plants in bunches.

In the preferred embodiment of the invention, the plant harvesting means of the harvesting machine comprises a plurality of these harvesting wheels mounted side by side on the harvesting vehicle and driven in rotation in unison. The primary advantage of the harvesting machine resides in the fact that several harvesting wheels may be arranged with a minimum center spacing between the adjacent wheels as small as 3". Accordingly, the present harvesting machine may be used to harvest root row crops with a 3" spacing between the adjacent plant rows. This 3" spacing is one-third the plant row spacing possible with the existing radish harvesting machine referred to earlier and thus permits a three-fold increase in the yield of a radish field as compared to the latter harvesting machine.

According to another feature of the invention, plant treatment means are arranged about the perimeter of each harvesting wheel for performing one of the following treatment operations on the plants harvested by the wheel during rotation of the plants through the transfer zone of the harvesting wheel: spraying the plants with a washing liquid, such as water, to wash the plants, trimming unedible root portions from the plants, brushing the plants to further clean the root portions, and spraying the plants with a cold liquid, such as liquid nitrogen, to chill the plants and thereby slow down their disintegration process. In the event the plants are released from the wheel in groups, as mentioned above, workers will be stationed on the machine adjacent the harvesting wheel for receiving the plants from the wheels and bundling the plants in bunches. Alternatively, plant topping and receiving means may be provided adjacent the releasing zone of each harvesting wheel for topping the plants as they are released from the wheel, that is trimming off the unedible top portions of the plants, and collecting their remaining, edible root portions. Conveyors are provided below the wheels for receiving the severed plant tops and transporting these tops from the harvesting machine.

In addition to its plant harvesting means, the described root row crop harvesting machine of the invention is equipped with seeding means for reseeding the plant rows immediately following the harvesting wheels. This seeding means forms furrows in the plant rows immediately following the harvesting wheels, lays seed strips into the furrows, finally recloses the furrows to bury the seed strips in soil. Washing liquid from the harvesting wheels drains out onto the plant rows following the harvesting wheels to water the newly planted seeds. In order to facilitate gripping of the plant tops by the plant gripping means of the harvesting wheels, air tubes extend through the receiving zone below each harvesting wheel and are provided with nozzles for directing air jets upwardly against the intervening plant tops to blow their leaves upwardly clear of the plant gripping means on the harvesting wheels.

BRIEF DESCRIPTION OF THE DRAWINGS

FIG. 1 is a fragmentary side elevation of a root row crop harvesting machine according to the invention with part section for the sake of clarity;

FIG. 2 is an enlarged fragmentary side elevation of one harvesting wheel of the harvesting machine;

FIG. 3 is a section taken on line 3—3 in FIG. 2;

FIG. 4 is an enlarged section taken on line 4—4 in FIG. 1 through the hub of one harvesting wheel;

FIG. 5 is an exploded fragmentary perspective view illustrating the manner of attachment of the harvesting wheel spokes to the wheel hub;

FIG. 6 is an enlarged exploded diametrical section through one harvesting wheel of the harvesting machine and the wheel cam means;

FIG. 7 is an enlarged section taken on line 7—7 in FIG. 1 through one harvesting wheel of the harvesting machine, showing the plant gripping means of the wheel in their closed plant gripping positions;

FIG. 8 is a section similar to FIG. 7 showing the plant gripping means of the harvesting wheel in their open plant releasing positions;

FIG. 9 is an enlarged section taken on line 9—9 in FIG. 1 through the bottom plant receiving zone of one harvesting wheel;

FIG. 10 is a section taken on line 10—10 in FIG. 9;

FIG. 11 is a section taken on line 11—11 in FIG. 9;

FIG. 12 is a section taken on line 12—12 in FIG. 9;

FIGS. 13 and 14 are semi-diagramatic perspective views illustrating the operation of the plant gripping means of one harvesting wheel;

FIG. 15 is an enlarged fragmentary side elevation of one harvesting wheel and its associated cam means for effecting opening and closing movement of the wheel plant gripping means;

FIG. 16 is a section taken on line 16—16 in FIG. 15;

FIG. 17 is a section taken on line 17—17 in FIG. 15;

FIG. 18 is a perspective view on reduced scale of the harvesting wheel cam means and conveyor means illustrated in FIG. 15;

FIG. 19 is an enlarged view looking in the direction of the arrow 19 in FIG. 18;

FIG. 20 is an exploded perspective view of certain spoke interconnection links embodied in each harvesting wheel;

FIG. 21 is a section taken on line 21—21 in FIG. 1;

FIG. 22 is an enlarged section taken on line 22—22 in FIG. 1;

FIG. 23 is an enlarged section taken on line 23—23 in FIG. 1;

FIG. 24 is a fragmentary perspective view of the harvesting machine;

FIG. 25 is a fragmentary side elevation of the harvesting wheel assembly of the harvesting means, illustrating the machine operation;

FIG. 26 is an enlarged perspective view of a plant or crop topper and receiver shown in FIG. 25;

FIG. 27 illustrates the cycloid path followed by each point on the perimeter of each harvesting wheel of the harvesting machine;

FIG. 28 is a section taken on line 28—28 in FIG. 1; and

FIG. 29 is a fragmentary perspective view illustrating the top-mowing cutter and conveyor mechanism utilized with the harvesting machine.

DESCRIPTION OF THE PREFERRED EMBODIMENT

Referring first to FIGS. 1 and 24, the root row crop harvesting machine 30 of the invention comprises a harvesting vehicle 32 movable along the crop or plant rows 34 containing the crops or plants 36 to be harvested. The harvesting vehicle 32 has drive wheels 38 which are driven in rotation through a chain drive 40 from a drive shaft 42 to propel the vehicle along the plant rows 34. Drive shaft 42 is driven from a prime mover (not shown) on the harvesting vehicle 32.

Mounted on the front end of the harvesting vehicle 32 are harvesting means 44 comprising a plurality of harvesting wheels 46. As will appear from the ensuing description, these harvesting wheels move with the harvesting vehicle 32 along the plant rows 34 and are effective to grip, extract from the soil, and deliver to a receiver the plants 36 in their respective plant rows.

At this point, it is significant to recall that the harvesting machine of the invention is designed to harvest crops or plants 36, of the kind referred to herein as row crops and shown in FIGS. 1 and 10–14. In these Figures, and particularly in FIGS. 10–12, it will be observed that each plant 36 has an edible root portion 36r within the soil and a top portion 36t above the ground. Examples of such row crops with edible roots are onions, radishes, turnips, beets, carrots, and the like. Examples of row crop plants having edible tops 36t above ground are parsley, mustard greens, turnip greens, and the like.

In order to accomplish harvesting of the plants 36 in the plant rows 34 by the harvesting wheels 46, the wheels are rotatably mounted side by side on the front end of the harvesting vehicle 32 in normally generally vertical longitudinal planes of the vehicle for movement with the latter along the individual plant rows 34. Means 48 are provided for effecting rotation of the harvesting wheels 46 in timed relation to movement of the harvesting vehicle along the plant rows.

Each harvesting wheel 46 includes a pair of annular, axially confronting plant gripping means 50 about the wheel perimeter. These plant gripping means are relatively movable locally toward one another to closed plant top gripping positions (FIGS. 7, 12, 22, 23) and away from one another to open plant releasing positions (FIGS. 8, 10, 11). Referring particularly to FIGS. 13 and 14, these plant gripping means 50 on each harvesting wheel 46 rotate with the wheel through a lower plant receiving zone 52 at the bottom of the wheel, a following transfer zone 54, an upper plant releasing zone 56, and then back to the lower plant receiving zone 52.

Associated with each harvesting wheel 46 are means 58, shown best in FIGS. 6–8, 10–12, 15, 16, and 18, for effecting local opening and closing movement of the plant gripping means 50 in timed relation to rotation of the harvesting wheel 46 to accomplish the following cyclic opening and closing movements of the gripping means. The plant gripping means 50 rotate through the lower plant receiving zone 52 in open position to receive therebetween the exposed, upstanding tops 36t of the plants 36 in the respective plant row 34, in the manner shown in FIGS. 10 and 11. Immediately thereafter, upon entering the transfer zone 54 of the harvesting wheel 46, the plant gripping means 50 close to grip the intervening plant tops 36t, as shown in FIG. 12, and to then extract the gripped plants from the soil and transport the same upwardly through the transfer zone to the upper plant releasing zone 56, as shown in FIGS. 13 and 14. The plant gripping means 50 reopen at the plant releasing zone 56 to release the harvested plants from the wheel, as shown in FIG. 14. As mentioned earlier, depicted in FIGS. 13 and 14, and hereinafter described in more detail, the plants may be released in groups from the harvesting wheel for bundling in bunches.

This building operation is performed by workers standing on the harvesting machine, as shown in FIG. 25. Alternatively, the plant topping and receiving means 60 may be provided for receiving and topping the plants released from each harvesting wheel 46 and collecting the edible plant roots, as illustrated in FIGS. 25 and 26 and described in more detail later.

About the perimeter of each harvesting wheel 46 are plant treatment means 62 for performing one or more of the following treatment operations on each harvested plant 36 during its rotation by the harvesting wheel through the wheel transfer zone 54: spraying of a washing liquid, such as water, against the plants to wash soil and other foreign matter from the plants, preferably atomized by pressurized air for effective cleaning and for removing dried outer plant leaves, as shown in FIG. 23, brushing to further clean the root portions, spraying the plants with a cold liquid, such as liquid notrigen for chilling the plants to slow their disintegration, as shown in FIG. 22, and trimming unedible root portions from the plants. As explained later, the particular harvesting machine illustrated performs all of these treatment operations on the harvested plants.

A feature of the illustrated harvesting machine 30 comprises a mower-type cutter 63 and an associated auger-type conveyor 65, mounted together in a forward position, as shown in FIGS. 1 and 29. These components are powered by an electric motor and appropriate drive means, as indicated in FIG. 29. The cutter has spiral cutting blades and cooperating components, which operate in the manner of a conventional lawn mower. The cutter mows the upper portions of plant tops 36t to provide tops of substantial uniform height before the plants engage the harvesting wheel. The cuttings fall to an underlying pan and are removed by the auger-type conveyor 65.

An additional feature of the illustrated harvesting machine resides in air tubes 64 which extend below the harvesting wheels 46 through their lower plant receiving zones 52 and direct air jets upwardly against the intervening plant tops 36t to blow their leaves upwardly and thereby facilitate gripping of the tops by the plant gripping means 50 on the harvesting wheels, as shown in FIGS. 10 and 12. The illustrated harvesting machine is also equipped with seeding means 66 for reseeding the harvesting plant rows 34 behind the harvesting wheels 46.

The presently preferred root crop harvesting machine 30 illustrated in the drawings will now be described in greater detail. As noted earlier, the harvesting vehicle 32 is a self-propelled vehicle having drive wheels 38 driven through a chain drive 40 from a drive shaft 42 which, in turn, is driven from a prime mover (not shown) on the vehicle. The harvesting vehicle may have any suitable configuration and, for simplicity of illustration, only the front end of the vehicle which mounts the harvesting means 44, as shown in the drawings.

The harvesting wheels 46 of the havesting means 44 are rotatably mounted on a frame structure 68 for unified adjustment of the wheels both horizontally, in the lateral direction of the vehicle, and vertically. As shown best in FIGS. 1 and 24, this frame structure includes a mounting plate 70 which is bolted or otherwise firmly attached to the front end of the harvesting vehicle 32 and extends horizontally across almost the entire front side of the vehicle. Slidably secured to the front side of this mounting plate, by a dovetail tongue-and-groove means 72, for endwise horizontal adjustment laterally of the vehicle, is an adjustable mounting plate 74. This adjustable mounting plate also extends virtually the entire width of the vehicle. The harvesting wheels 46 are directly rotatably supported on a frame 76 which is slidably keyed, by dovetail tongue-and-groove means 78, to the horizontally adjustable mounting plate 74 for vertical adjustment of the wheel frame 76 relative to the adjustable mounting plate 74. Adjustment screws 69 are provided for effecting this vertical adjustment of the wheel frame. Adjustment screws (not shown) may also be provided for effecting horizontal adjustment of the adjustable mounting plate 74. From this description, it will be evident that the harvesting wheel frame 76 and, thereby, the harvesting wheels 46, are adjustable relative to the harvesting vehicle 32 both vertically and horizontally, in the lateral direction of the vehicle.

Harvesting wheel frame 76 comprises parallel frame plates 80 extending in the fore and aft direction of the harvesting vehicle 32 and straddling the harvesting wheels 46 in such a way that each wheel is saddled by a pair of the frame plates. The front ends of these frame plates incline downwardly, as shown. The front and rear ends of the two frame plates 80 which straddle each pair of harvesting wheels 46 are rigidly joined by front and rear end walls 82, 84, whereby the two frame plates and their front and rear end walls effectively form a frame module for the respective harvesting wheel. These several frame modules are rigidly joined in any convenient way side by side, as shown, to form an integral frame structure which constitutes the wheel frame 76. The vertical adjustment tongue-and-groove means 78 for this wheel frame includes a vertical beveled groove in the rear wall 84 of each module of the frame and a corresponding beveled tongue on the horizontally adjustable frame mounting plate 74. A horizontal platform 86 is rigidly joined to the front ends of the wheel frame modules, for reasons to be explained presently.

Turning now to FIGS. 1 through 8, the detailed construction of the harvesting wheels 46 will be described. Since these harvesting wheels are essentially identical, a description of one will suffice for all. With this in mind, each harvesting wheel has a hub assembly 88 including a central sleeve 90. Hub sleeve 90 is mounted on a tubular wheel supporting shaft 92 carried by and extending between the adjacent wheel frame plates 80. This supporting shaft comprises two coaxial parts 94, 96 joined at their inner ends by a threaded coupling 98. The outer ends of these shaft parts 94, 96 extend through aligned openings in the frame plates 80 and have external flanges 100 which seat within counterbores in the frame plates to position the shaft axially. It should be noted here that the tubular supporting shafts 92 for all of the harvesting wheels 46, and hence the wheels themselves, are coaxially aligned.

Slidably but snugly fitted on the hub sleeve 90 are the inner races of a pair of ball bearings 102 which are retained on the sleeve by nuts 104 threaded on the sleeve ends. Mounted on the outer spaces of the ball bearings 102 are axially outer and inner hub rings 106, 108 and sprockets 110 axially outboard of the outer hub rings 106. Each sprocket 110 and its adjacent hub rings 106, 108 are rigidly joined by a plurality of bolts 112 which serve to firmly clamp the hub rings to one another and to the sprockets.

As noted earlier, each harvesting wheel 46 has a pair of axially confronting plant gripping means 50 about the wheel perimeter. Each of these plant gripping means comprises a multiplicity of separate plant gripping elements or pads 114 preferably constructed of a resilient material, such as rubber. The several pads 114 of each plant gripping means are arranged side by side in a circular row coaxial with the harvesting wheel 46. Each plant gripping pad 114 is attached, by means 116, to the outer end of a resilient spoke 118 which extends radially out from and is secured at its radially inner end to the harvesting wheel hub assembly 46. Attachment of the inner end of each spoke to the hub assembly is accomplished by clamping of the inner spoke end between a pair of the inner and outer hub rings 106, 108 in the manner illustrated in FIGS. 4 and 5. In this regard, it should be noted that the spokes 118 for one circular row of the gripping pads 114 are clamped between one pair of the hub rings 106, 108, and the spokes for the other circular row of gripping pads are clamped between the other pair of hub rings. Referring particularly to FIGS. 4 and 5, it will be seen that the axially outer side of each of the axially inner hub rings 108 is formed about its perimeter with a multiplicity of generally semi-cylindrical recesses 120 which extend generally radially of and open through the circumference of the respective hub rings to receive the inner ends of the corresponding spokes 118. The axially inner side of each axially outer hub ring 106 is formed about its perimeter with a clamping face 122 which is engageable with the inner ends of the respective spokes 118, whereby the inner ends of the spokes 118 for each circular row of plant gripping pads 114 are firmly clamped between the corresponding hub rings 106, 108 when the hub ring bolts 112 are tightened. The recesses 120 position the spokes generally radially of the harvesting wheel.

As noted earlier, the plant gripping means 50 of each harvesting wheel 46 are relatively movable, in the axial direction of the wheel, toward one another to the closed plant gripping positions shown in FIG. 7 and away from one another to the open plant releasing positions shown in FIG. 8. In the particular harvesting machine illustrated, the plant gripping means 50 of each harvesting wheel are yieldably biased to their closed plant gripping positions and are forceably separated to their open plant releasing positions by means 58 which were referred to earlier and will be hereinafter described in more detail. Yieldable biasing of the plant gripping means 50 to their closed plant gripping positions is accomplished by inclining the spoke receiving grooves 120 and spoke clamping faces 122 on the two sets of hub rings 106, 108 axially toward one another by the angle $\theta$ in FIG. 5 in such a way that the two sets of spokes 118 for the two circular rows of plant gripping pads 114 normally incline toward one another, as shown. The angle $\theta$ is selected such that each pair of confronting plant gripping pads 114 are normally yieldably retained in their closed plant gripping positions of FIG. 7, wherein the confronting pads are disposed in face to face contact, as shown.

The attachment means 116 which secure the plant gripping pads 114 to the outer ends of the spokes 118 comprise brackets 126 fastened by rivets 128 to the rear, i.e. axially outer, sides of the pads and having link-like plates 130 which are disposed in end-to-end overlapping relation circumferentially of the harvesting wheel, as shown. The outer ends of the spokes 118 extend through aligned openings in alternate overlapping ends of the plates or links 130 and have nuts 132 threaded on the spokes at opposite sides of the links to pivotally join the respective overlapping links. The intervening overlapping link ends are pivotally joined by bolts 134 which extend through aligned openings in these ends. It will now be understood, therefore, that the links 130, outer ends of the spokes 118, and bolts 134 for each circular row of gripping pads 114 effectively form an annular, articulated link structure which interconnect the respective adjacent pads and spokes in a manner which resists circumferential separation of the pads in the circumferential direction of the harvesting wheel and yet permit local relative opening and closing movement of the confronting plant gripping pads 114 in timed relation to rotation of the harvesting wheel in the manner mentioned earlier and hereinafter discussed in more detail.

As mentioned earlier, associated with each harvesting wheel 46 are means 58 for effecting such opening and closing movement of the plant gripping pads 114 in timed relation to rotation of the harvesting wheel. In this regard, attention is directed to FIG. 9 which illustrates in enlarged detailed the articulated closing movement of the gripping pads within the lower plant receiving zone of the harvesting wheel.

As mentioned earlier, associated with each harvesting wheel 46 are means 58 for effecting such opening and closing movements of the plant gripping means 50, i.e. gripping pads 114, in timed relation to rotation of the wheel. Means 58 will now be described in detail by reference to FIGS. 1 through 4 and 6 through 20. At the outset of this description, it is significant to recall that the plant gripping pads 114 of each harvesting wheel are yieldably biased to their closed plant gripping positions and that the means 58 serve to forcibly separate the confronting pads to their open plant releasing positions. With this in mind, the means 58 for each harvesting wheel comprises a generally cylindrically curved cam structure 136 concentric with the wheel and disposed between the two sets of wheel spokes 118 for the two circular rows of plant gripping pads 114 on the wheel. This cylindrical cam structure is radially located about midway between the inner and outer ends of the spokes and extends about the front half of the wheel between the lower plant receiving zone 52 and the upper plant releasing zone 56 of the wheel. Cam structure 136 includes a lower fixed, cylindrically curved cam 138 and an upper circumferentially movable, cylindrically curved cam 140. The lower fixed cam 138 comprises a cylindrically curved metal plate having a central opening 146 through which extends a generally horizontal supporting bar 148 which is located somewhat below the level of the harvesting wheel axis. Bolted to the rear end of this supporting bar are a pair of bracket plates 150 which incline upwardly toward the axis of the harvesting wheel and are supported at their upper ends on the harvesting wheel hub sleeve 90 between the hub ball bearings 102, as shown best in FIG. 4. The front end of the supporting bar 148 is supported on the harvesting wheel frame 76 is the manner explained presently. Suffice it to say at this point that the supporting bar 148 is fixed in position relative to the harvesting wheel frame 46. The lower fixed cylindrical cam plate 142 is welded or otherwise rigidly attached to opposite sides of the supporting bar 148, as indicated at 152 in FIG. 15, whereby this cam plate is fixed relative to the harvesting wheel frame 46. Bolted to the lower end of the cam plate 142 is a cylindrically curved cam plate extension 154 which extends a short distance beyond the lower end of the cam plate 142. Rotatably mounted on the under side of the extending end of the cam plate extension 154 are a pair of sprocket wheels 156.

The upper circumferentially movable harvesting wheel cam 140 comprises a cylindrically curved cam plate 158 of the same width as the lower fixed cylindrically curved cam plate 142. The upper end of this movable cam plate 158 is rigidly attached to a radial supporting arm 160, the inner end of which is rotatably supported on the harvesting wheel hub sleeve 90 between the supporting bracket arms 150 for the lower cam supporting bar 148. It will be understood, therefore, that the arm 160 and hence the upper cam plate 158 are rotatable about the axis of the harvesting wheel 46. As will appear from the ensuing description, the upper cam plate 158 is oscillated circumferentially of the harvesting wheel during operation of the harvesting machine. The circumferential length of the upper cam plate and its radial distance from the harvesting wheel axis is such that the lower end of this plate slidably overlaps the upper end of the lower fixed cam plate 142 throughout the range of oscillation of the movable plate. Also fixed to the outer end of arm 160 is an upper cam plate extension 162 which extends a short distance beyond the upper end of the movable cam plate 158. Rotatably mounted on the upper side of the extending end of this cam plate extension are a pair of sprockets 164.

As noted earlier, the cam structure 136 is located between the two sets of spokes 118 for the two circular rows of plant gripping pads 114 of the harvesting wheel and approximately midway between the radially inner and outer ends of the spokes. Rotatably mounted on the spokes 118 in axial alignment with the cam structure 136 are rollers 166 for rolling engagement with the side edges of the cam structure. Straddling the rollers 166 are links 168 which are apertured to rotatably receive and pivotally connect the adjacent spokes. The rollers 166 and links 168 are retained in axial position along the spokes by nuts 170 threaded on the spokes. It will now be understood, therefore, that the links 168 effectively form an annular, articulated link structure similar to that formed by the outer links 130 and which interconnect the adjacent spokes against relative movement circumferentially of the harvesting wheel while permitting relative movement of the spokes in the axial direction of the wheel as necessary for opening and closing movement of the plant gripping pads 114.

From the description thus far, it will be understood that during the front half of each revolution of the harvesting wheel spokes 118 with the harvesting wheel, the spokes rotate along the cam structure 136 from the upper end to the lower end of this cam structure. During this rotation of the spokes along the cam structure, the spoke rollers 166 roll along the side edges of the cam plates 142, 158. The cam structure serves to deflect the harvesting wheel spokes 118 in directions to separate the plant gripping pads 114 of the harvesting wheel to their open plant releasing positions of FIG. 8. The cam sprocket wheels 156, 164 serve to guide these spokes smoothly onto and from the cam structure, in the manner illustrated in FIG. 19. Thus, during rotation of the harvesting wheel 46, the plant gripping pads 114 on the wheel remain closed in their plant gripping positions during their rotation from the lower plant receiving zone 52 at the lower end of the cam structure 136, and upwardly through the transfer zone 54 to the upper plant releasing zone 56 at the upper end of the cam structure. The gripping pads are then open to their plant releasing positions and remain in these open positions during their rotation along the cam structure from the upper plant releasing zone to the lower plant receiving zone.

Means 172 are provided for oscillating the movable cam 158 relative to the fixed cam 142 in timed relation to rotation of the harvesting wheels 46. Oscillating means 172 comprises an arm 174 composed of a pair of separate arm members 175. The lower ends of these arm members straddle the cam structure support arm 148 and a pair of sprockets 176 rotatably mounted at opposite sides of the support arm. Sprockets 176 are keyed to one another for rotation in unison and are attached by coaxial pivots 178 offset from the sprocket axis to the lower ends of arm members 175 to form an oscillatory crank for the arm 174.

The upper ends of the arm members 175 straddle the movable cam support arm 160 and are joined to one another by a bolt 180 and an intervening spacer (not shown) extending through a longitudinal slot 182 in the arm 160. Rigid on the upper end of one arm member 175 is a block 184 which is threaded on a lead screw 186 rotatably mounted on the upper movable cam 158 and its support arm 160. The upper end 188 of the lead screw is accessible, as shown in FIG. 18, for rotation of the lead screw to adjust the block 184, and thereby the upper end of arm 174, along the cam support arm 160.

Sprockets 176 are drivably coupled by sprocket chain drives 190 to a driving shaft 192 extending beyond opposite sides of the cam structure support plate 148 and rotatably supported on this plate and the corresponding harvesting wheel frame plates 80. Driving shaft 192, in turn, is drivably connected through sprocket chain drives 194 to an idler shaft 196 extending between the rear ends of and rotatably supported by the harvesting wheel frame plates 80. This idler shaft 196 is also drivably connected through sprocket chain drives 198 to the harvesting wheel sprockets 110. Idler shaft 196, in turn, is drivably coupled through a sprocket chain drive 199 to the main harvesting machine drive shaft 42.

From the description to this point, it will be understood that during operation of the harvesting machine, the several harvesting wheels 46 and their respective sprockets 176 are driven in rotation in timed relation to one another. This rotation of the sprockets 176 for each harvesting wheel drives the lower end of the corresponding arm 174 in a rotary crank motion which imparts an oscillatory motion to the corresponding movable cam 158 and cam support arm 160 about the harvesting wheel axis. Thus, the sprockets 176 and arm 174 for each harvesting wheel effectively constitute a crank mechanism for driving the corresponding movable cam 158 in a back and forth oscillatory motion relative to its fixed cam 142 in timed relation to rotation of the respective harvesting wheel 46. Rotation of the lead screw 186 to radially adjust the outer end of each crank arm 174 along the corresponding movable cam support arm 160 adjusts the oscillatory arc of the movable cam 158.

Consider now the operation of one harvesting wheel 46 of the harvesting machine. As the harvesting vehicle 32 travels forwardly along the crop rows 34 to be harvested, the harvesting wheel moves along one of these rows and is driven in clockwise rotation, as viewed in FIG. 1, in timed relation to the forward motion of the harvesting vehicle. This timed relation is such that the lowermost point of the harvesting wheel perimeter is effectively stationary relative to the ground and the relative movement of each point on the perimeter relative to the ground occurs along a cycloidal path, as illustrated in FIG. 27. The harvesting wheel cam structure 58 retains the plant gripping pads 114 of the harvesting wheel in their open plant releasing positions during rotation of these pads along the front side of the wheel from its upper plant releasing zone 56 through its lower plant receiving zone 52. The gripping pads then close to their plant gripping positions during their rotation along the rear side of the harvesting wheel from the lower plant receiving zone 52 back to the upper plant releasing zone 56.

As the harvesting wheel 46 proceeds forwardly along its plant row 34, the tops 36t of the plants 36 in the row enter between the open plant gripping pads 114 currently located within the lower plant receiving zone 52, as illustrated in FIGS. 10 and 11. The gripping pads then close to their plant gripping positions upon rearward emergence from the plant receiving zone to grip the plant tops between the confronting pads, as shown in FIG. 12. The harvesting wheel air tubes 64 blow the plant leaves upwardly, as shown in FIG. 11, such that only the root portion of a gripped plant is exposed below the corresponding gripping pads, as shown in FIG. 12. Owing to the cycloidal motion of the harvesting wheel gripping pads 114 relative to the ground, illustrated in FIG. 27, the gripped plants are extracted almost vertically from the soil, whereby the plants are subjected to very little if any horizontal force or displacement which would damage the plants. The extracted plants are then transported upwardly to the plant releasing zone 56 where the gripping pads are opened by the cam structure 58 to release the harvested plants from the harvesting wheel.

This opening of the gripping pads is accomplished by the upper oscillatory cam elements 158, 162, 164 and occurs in such a way that the plants are released periodically from the harvesting wheel in groups for bundling of the harvested plants in bunches. Thus, during rotation of the harvesting wheel 46, its associated crank mechanism 174, 176, 178, oscillates the cam elements 158, 162, 164 about the harvesting wheel axis in timed relation to the wheel rotation. This oscillatory motion of the cam elements occurs alternately forwardly in the direction of wheel rotation toward the fixed cam 142 to a retracted position relative to the latter cam and rearwardly in the opposite direction to wheel rotation away from the fixed cam to an extended position relative to the latter cam. The arc of this oscillation defines the upper plant releasing zone 56.

During each forward retraction stroke, the cam elements 158, 162, 164 rotate forwardly from the plant releasing zone 56, thus permitting the leading group of harvested plants 34 on the harvesting wheel 46 to enter the releasing zone without being released from the harvesting wheel by opening of the corresponding wheel gripping pads 114. During the following rearward extension stroke, the cam elements 158, 162, 164 rotate rearwardly back through the plant releasing zone to open all of the gripping pads 114 within the zone and thereby release, as a group, all of the harvesting plants in the zone. Each group of plants thus released from the harvesting wheel are grasped and bundled by a worker standing on the harvester platform 86.

The arc of oscillation of the cam elements 158, 162, 164 for each harvesting wheel 46, and hence the number of harvested plants in each plant group released from the wheel, are adjustable by adjusting the upper end of the corresponding crank arm 174 along the movable cam support arm 160. Inward adjustment of this crank arm along the support arm increases the arc of oscillation of the movable cam elements and, thereby, the number of harvested plants in each plant group released from the harvesting wheel. Similarly, outward adjustment of the crank arm along the support arm reduces the arc of oscillation of the movable cam elements and, thereby, the number of plants in each plant group released from the harvesting wheel.

As noted earlier, rather than manually bunching the harvested plants, the harvesting machine may be equipped with means 60 for topping the plants on the harvesting wheel 46 and delivering the topped plants to receivers, as shown in FIGS. 25 and 26. Topping means 60 comprises a plant topper 200 for each harvesting wheel 46. This plant topper includes a tubular chute 202 mounted by brackets 203 on the wheel frame 76, in a position generally tangential to the front side of the wheel. The upper end of the chute mounts a pair of wings 204 forming a V-shaped mouth 206 adjacent the harvesting wheel perimeter and leading to the upper open end of the chute. At the lower narrow end of this mouth is a serrated blade 207 which is slidably supported in guides 208 and is driven in endwise reciprocation by a motor 210 through a right angle drive 212. In this case, the upper cam oscillating means 172 of each harvesting wheel is inactivated, as by detaching the corresponding crank arm 174 from its crank sockets 176. Also, the upper oscillatory cam elements 158, 162, 164 are locked in fixed position relative to their fixed cam 142 by means 214 in a position to accomplish the following mode of operation.

During movement of the harvesting wheels 46 with the harvesting machine along the plant rows 34, when employing the plant topping means 60, the wheel gripping pads 114 on the harvesting wheels are closed as they emerge from the lower plant receiving zones 52 of the wheels to grip the plants 36 in the plant rows and extract the plants from the soil in the same manner as described earlier. Movable cams 158 of the harvesting wheels are fixed in position such that the wheel gripping pads 114 remain closed to grip the plants until they reach the topper 200 and then open to release the plants. These plant toppers are mounted in position such that the exposed root portions 36r of the harvested plants on the wheels enter the upper ends of the topper chutes 202 and their tops 36t, adjacent the root portions, enter the topper mouths 206. Plant tops 36t are severed from the root portions 36r by the respective reciprocating topper blades 207. The root portions drop into the topper chutes 202 which conduct the root portions to boxes 216 or other receivers on the machine. The severed plant tops 36t fall onto underlying conveyors 218 formed by the sprocket chains 190 which normally drive the cam oscillating crank sprockets 176, and additional sprocket chains 220 driven from the driving shafts 192. Conveyors 218 convey the severed tops from the machine.

As noted earlier, there is associated with each harvesting wheel 46 of the harvesting machine a plant treatment means 62. The treatment means include a lower plant washer 222, an intermediate plant brushing apparatus 259, and an upper plant chiller 224 arranged circumferentially about the harvesting wheel. The lower plant washer 222 comprises a rectangular housing 226 which is mounted on the machine in a manner to be explained presently. This housing has open ends facing circumferentially of the harvesting wheel 46 and a slot 228 along the radially inner side of the housing. This slot is sized to receive the outer ends of the harvesting wheel spokes 118 and their gripping pads 114 with the latter disposed in their closed plant gripping positions, as shown in FIG. 23. The outer ends of the spokes mount rollers 230 between the radially inner and outer spoke interconnecting links 130. These rollers ride along the edges of the washer housing slot 228, as illustrated in FIG. 23.

During operation of the harvesting machine, the harvested plants 36 on each harvesting wheel are transported through the corresponding washer housing 226 during rotation of the plants with the wheel through its transfer zone 54. Mounted within the washer housing 226 at opposite sides thereof are spray tubes 232 which are connected through a supply line 233 to high pressure air and water sources on the harvesting vehicle 32. These tubes mount jets for the spraying of atomized water, comprising approximately 10% water and 90% air, against opposite sides of the harvested plants to wash the plants, in the manner illustrated in FIG. 23. As will appear presently, the drainage water from the plant washers 222 is utilized to irrigate the reseeded plant rows behind the harvesting wheels.

The plant chiller 224 for each harvesting wheel 46 comprises a curved open ended thermally insulated housing or tunnel 234. This tunnel is similar in cross section to the washer housing 226 and extends about a portion of the harvesting wheel perimeter following the plant brusher 259, root trimmer 238, and washer 222. The harvested plants 36 on the harvesting wheel are transported through the chiller tunnel 234 in the same manner as through the washer housing 226. Mounted within and extending lengthwise of the chiller tunnel are spray tubes 236 connected through a supply line 237, to a source of a pressurized refrigerant, such as liquid nitrogen, on the harvesting vehicle 32. The chiller spray tubes 236 have wall openings through which the refrigerant is sprayed onto the harvested plants as the latter travel through the chiller tunnel 234 to chill the plants and thereby preserve the latter against the deterioration which the plants normally tend to experience if not chilled immediately following harvesting.

A brushing apparatus 259 for each harvesting wheel 46 is mounted on the frame adjacent to the harvesting wheel above and following the trimmer 238, and comprises two counter rotating brushes, best shown in FIG. 28, driven by an electric motor. The counter rotating brushes serve to further clean and scrub the plant root portions.

A trimmer 238 is mounted on the frame for each harvesting wheel 46 between the plant washer 222 and plant brusher 259 for the respective wheel. The trimmer comprises a motor 240 driving a rotary cutter 242 for trimming unedible root pendages from the plants 36 as the latter travel from the washer to the brusher and chiller.

As noted earlier, plant row reseeding means 66 are provided on the harvesting machine for reseeding the harvested plant rows 34 behind the harvesting wheels 46. The reseeding means for each wheel comprises an upright bar-like support 244 mounted by bolt and slot connections 246 on the respective harvesting wheel frame 76 for vertical adjustment relative to the frame. The lower end of this support is shaped to form a plow shoe 248 for excavating a shallow trench or furrow in the plant row immediately behind the respective harvesting wheel. Extending along the support is a guide tube 250 for a seed strip 252 leading from a seed strip supply roll 254 rotatably mounted on the upper end of the support. The lower end of this seed strip guide curves rearwardly and opens through the rear end of the plow shoe 248.

Prior to harvesting operation of the machine, the leading ends of the several seed strips 252 are implanted in the soil of their respective plant rows 34. Accordingly, as the harvesting machine moves forwardly along the plant rows, the seed strips 252 are pulled out through their guide tubes 250 and are thereby paid out into the furrows dug by their respective plow shoes 24. Plow wings 256 are provided on each reseeder support 244 for closing the furrow over the planted seed strip, and a trailing roller 257 is pivotally mounted on the support for lightly packing the soil over the planted seed strip.

The spout washer 222 for each harvesting wheel 46 has a drain spout 258 through which wash water is drained from the washer onto the corresponding reseeded plant row to irrigate the newly planted seeds in the row. Liquid fertilizer is supplied to each washer drain spout through a tube 260 from a liquid fertilizer source on the harvesting vehicle 32 for fertilizing the newly planted seeds.

Operation of the harvesting machine is now obvious. Thus, the harvesting machine is propelled along the plant rows to be harvested with the harvesting wheels 46 aligned with the rows, respectively. In this regard, it is significant to again emphasize that an important advantage of the harvesting machine resides in the fact that the relative close side by side placement of the harvesting wheels permit a correspondingly close placement of the plant rows. This close plant row spacing or placement, in turn, substantially increases the crop production or harvest from a field of given size. It will be understood that the harvesting wheels are vertically and horizontally adjustable in unison to locate the wheels at the proper elevation and in the proper horizontal position laterally of the vehicle for the particular plants to be harvested.

As the machine proceeds along the plant rows 34 to be harvested, its harvesting wheels are driven in rotation in unison with one another and in timed relation to the forward motion of the machine, such that each point along the plant gripping means 50 of each wheel undergoes motion relative to the ground conforming substantially to the cycloidal path described earlier.

The wheel plant gripping means 50 rotate through the lower plant receiving zones 52 in their open plant receiving positions to receive therebetween the tops 36t of plants 36 in the respective plant rows. The gripping means close as they emerge from the plant receiving zone into the following transfer zones 54 of the harvesting wheels, whereby the intervening plant tops are gripped and the plants are pulled from the ground, and transported upwardly to the plant releasing zones 56. The plants are washed, trimmed, brushed, and chilled by the plant treatment means as they rotate through the transfer zones to the plant releasing zones.

Upon entering the plant releasing zones 56, the harvested plants may be released in groups for bundling in bunches by workmen stationed on the harvesting machine. Alternatively, the plants may be topped and then collected in cropped receivers or receptacles 216 on the machine.

The inventor claims:

1. A machine for harvesting root row crops comprising plants having tops exposed above the ground, said harvesting machine comprising:

a vehicle movable along the plant rows, a harvesting wheel rotatably mounted on said vehicle in a normally generally vertical longitudinal plane for movement with the vehicle along an individual plant row, means for effecting rotation of said wheel in timed relation to movement of said vehicle along the plant rows, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprise two continuous circular rows of immediately adjacent opposing plant top gripping elements which are independently movable in closing movement toward one another and opening movement away from one another, and link means interconnecting adjacent gripping elements of each of said rows to form a continuous belt to provide a continuous sequence of such independent closing and opening movement of the gripping elements, and means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, said means for effecting opening and closing movement of said gripping means comprises means for effecting closing movement of the opposing gripping elements toward one another in succession as said gripping elements rotate from said receiving zone to said transfer zone and opening movement of the opposing gripping elements away from one another in succession as said gripping elements rotate from said transfer zone to said plant releasing zone, said means for effecting opening and closing movement of said gripping elements comprising spring means for yieldably biasing said gripping elements in one direction of their opening and closing movement and cam means for moving said gripping elements in the opposite direction, said spring means comprising spring fingers fixed to said wheel at one end and mounting said gripping element at the other end and stressed to urge said gripping elements in said one direction of their opening and closing movement, said cam means being engageable with said fingers in succession as said wheel turns for moving said gripping elements in said opposite direction.

2. A machine for harvesting root row crops comprising plants having tops exposed above the ground, said harvesting machine comprising:

a vehicle movable along the plant rows, a harvesting wheel having a central hub rotatably mounted on said vehicle in a normally generally vertical longitudinal plane of the wheel for movement with the vehicle along an individual plant row, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprise two circular rows of opposing plant top gripping elements which are independently movable in closing movement toward one another and opening movement away from one another, means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, said means for effecting opening and closing movement of said gripping means comprises means for effecting closing movement of the opposing gripping elements toward one another in succession as said gripping elements rotate from said receiving zone to said transfer zone and opening movement of the opposing gripping elements away from one another in succession as said gripping elements rotate from said transfer zone to said plant releasing zone, said means for effecting opening and closing movement of said gripping elements comprising spring means for yieldably biasing said gripping elements in one direction of their opening and closing movement and cam means for moving said gripping elements in the opposite direction, said spring means comprising spring fingers fixed to said wheel at one end and mounting said gripping element at the other end and stressed to urge said gripping elements in said one direction of their opening and closing movement, said spring fingers comprising radial spokes fixed at their inner ends to said hub and mounting said gripping elements at their outer ends, said spokes being stressed to urge the opposing gripping elements toward one another to their closed position, and said cam means being disposed between the spokes for the two rows of gripping elements for retaining said gripping elements in their open positions within said plant releasing and plant receiving zones.

3. A harvesting machine according to claim 2 wherein:

said cam means comprises a relatively fixed cam for retaining said gripping elements in their open positions within said receiving zone, a relatively movable cam for retaining said gripping elements in their open positions within said plant releasing zone, and means for oscillating said movable cam circumferentially of said wheel in timed relation to rotation of said wheel in such a way as to periodically release groups of plants from the wheel.

4. A harvesting machine according to claim 3 wherein:

said fixed cam comprises a cylindrically curved band concentric with the wheel and extending from the trailing end of said releasing zone through said receiving zone, and said movable cam comprises a cylindrically curved band concentric with said wheel and extending through said releasing zone into circumferentially overlapping relation to said fixed cam band, and said spokes mount cam followers engageable with the longitudinal edges of said cam bands.

5. A machine for harvesting root row crops comprising plants having tops exposed above the ground, said harvesting machine comprising:

a vehicle movable along the plant rows, a harvesting wheel rotatably mounted on said vehicle in a normally generally vertical longitudinal plane of the wheel for movement with the vehicle along an individual plant row, means for effecting rotation of said wheel in timed relation to movement of said vehicle along the plant rows, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprise two circular rows of opposing plant top gripping elements about the perimeter of said wheel, radial fingers mounting said gripping elements on said wheel for independent closing movement of the opposing gripping elements toward one another to closed plant gripping positions and independent opening movement of the gripping elements away from one another to open plant releasing positions, and links pivotally connecting the adjacent fingers in such a way as to permit said independent opening and closing movement of said gripping elements, and means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, said means for effecting opening and closing movement of said gripping means comprises means for effecting closing movement of the opposing gripping elements in succession as said gripping elements rotate from said receiving zone to said transfer zone and opening movement of the opposing gripping elements in succession as said gripping elements rotate from said transfer zone to said plant releasing zone.

6. A harvesting machine according to claim 5, wherein:

said wheel has a central hub, said fingers comprise radial spokes fixed at their inner ends to said hub and at their outer ends to said gripping elements, respectively, and said links pivotally connect the adjacent spokes.

7. A harvesting machine according to claim 6 wherein:

said spokes are resiliently flexible and stressed to bias said gripping elements toward one another to their closed positions, said means for effecting opening and closing movement of said gripping means comprises cam means located between the spokes for the two rows of gripping elements and engageable with said spokes at positions intermediate the inner and outer spoke ends for retaining said gripping elements in their open positions within said receiving and releasing zones, and said links include radially inner links pivotally connecting the adjacent spokes close to said intermediate spoke positions and radially outer links pivotally connecting the outer ends of adjacent spokes.

8. A machine for harvesting root row crops comprising plants having tops exposed above the ground, said harvesting machine comprising:

a vehicle movable along the plant rows, a harvesting wheel rotatably mounted on said vehicle in a normally generally vertical longitudinal plane for movement with the vehicle along an individual plant row, means for effecting rotation of said wheel in timed relation to movement of said vehicle along the plant rows, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprising at least one substantially continuous circular row of immediately adjacent gripping sections, and link means interconnecting adjacent gripping sections of each of said rows to form a continuous belt to provide a continuous sequence of such independent closing and opening movement of the gripping sections, and means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, said means for effecting opening and closing movement of said gripping means comprising means for effecting progressive closure of said gripping means as said gripping means rotate from said receiving zone to said transfer zone and means for effecting opening in intermittent fashion of successive sections of said continuous row of gripping means within said releasing zone, in a manner such that said gripping means are effective to grip and then extract from the soil successive plants in a plant row being harvested and thereafter release the extracted plants in groups for bundling of the harvested plants in bunches.

9. A machine for harvesting root row crops comprising plants having tops exposed above the ground, said harvesting machine comprising:

a vehicle movable along the plant rows, a harvesting wheel rotatably mounted on said vehicle in a normally generally vertical longitudinal plane of the wheel for movement with the vehicle along an individual plant row, means for effecting rotation of said wheel in timed relation to movement of said vehicle along the plant rows, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, and said means for effecting opening and closing movement of said gripping means comprises means for effecting progressive closure of said gripping means as said gripping means rotate from said receiving zone to said transfer zone and means for effecting opening in intermittent fashion of successive circumferential sections of said gripping means within said releasing zone, in a manner such that said gripping means are effective to grip and then extract from the soil successive plants in a plant row being harvested and thereafter release the extracted plants in groups for bundling of the harvested plants in bunches, said means for effecting opening of said gripping means in intermittent fashion within said releasing zone including means for adjusting the circumferential length of said successively opened circumferential sections of said gripping means.

10. A harvesting machine according to claim 7 wherein:
said means for effecting opening and closing movement of said gripping means includes means for effecting intermittent opening movement of successive groups of said gripping elements within said releasing zone in a manner such that extracted plants are released in groups for bundling.

11. A harvesting machine according to claim 10 wherein:
said means for effecting intermittent opening movement of successive groups of said gripping elements includes means for adjusting the number of gripping elements in each said group and, thereby, the number of plants in each plant group released from the wheel.

12. A machine for harvesting root row crops in the form of plants having tops exposed above the ground, said harvesting machine comprising:
a vehicle movable along the plant rows,
harvesting wheel means on said vehicle movable with the vehicle along at least one plant row for harvesting the successive plants in the row by gripping the plant top and extracting the plant from the soil and thereafter transporting the harvested plant along a prescribed path to a plant releasing zone where the harvested plants are released from the harvesting means,
said harvesting means including a pair of axially closely spaced substantially continuous circular rows of immediately adjacent gripping sections relatively movable locally toward one another to closed plant gripping positions and away from one another to open plant releasing posisions and which rotate with the wheel through the plant receiving zone and the plant releasing zone, and link means interconnecting adjacent gripping sections of each of said rows to form a continuous belt to provide a continuous sequence of such independent closing and opening movement of the gripping sections, and
plant treatment means mounted on said vehicle along said path for performing at least one operation on the successive plants.

13. A harvesting machine according to claim 12 wherein:
said plant treatment means comprises means for spraying the harvested plants with a an atomized air-water mixture to wash the plants as they move along the path of transport by said harvesting means, said spraying means including jets and sources of water and high pressure air connected with the jets.

14. A harvesting machine according to claim 12 wherein:
said plant treatment means comprises plant washing means including a shroud forming a tunnel along said path through which the harvested crops are transported by said harvesting means, sources of water and pressurized air on the machine, and spray tubes within said tunnel and connected with said water and air sources for spraying an air-water mixture on the plants to wash the plants.

15. A harvesting machine according to claim 12 wherein:
said plant treatment means comprises a chiller tunnel along said path through which the harvested plants are transported by said harvesting means, a source of pressurized refrigerant fluid on the machine, and means connected with the refrigerant source for directing a cold refrigerant fluid against the harvested plants being thus transported through the tunnel to chill the plants.

16. A machine for harvesting root row crops in the form of plants having tops exposed above the ground, said harvesting machine comprising:
a vehicle movable along the plant rows,
harvesting wheel means on said vehicle movable with the vehicle along at least one plant row for harvesting the successive plants in the row by gripping the plant top and extracting the plant from the soil and thereafter transporting the harvested plant along a prescribed path to a plant releasing zone where the harvested plants are released from the harvesting means,
said harvesting means including a pair of axially closely spaced substantially continuous circular rows of gripping sections relatively movable locally toward one another to closed plant gripping positions and away from one another to open plant releasing positions and which rotate with the wheel through the plant receiving zone and the plant releasing zone,
plant washing means mounted on said vehicle along said path and including a shroud forming a tunnel along said path through which the harvested crops are transported by said harvesting means, said shroud including a drain for draining washing liquid from said tunnel onto the plant row following said harvesting means, and said washing means including means within said tunnel for spraying a washing liquid such as water on the plant to wash the plant, and
means for depositing seeds in the plant row following said harvesting means.

17. A machine for harvesting root row crops in the form of plants having tops exposed above the ground, said harvesting machine comprising:
a vehicle movable along the plant rows,
harvesting wheel means on said vehicle movable with the vehicle along at least one plant row for harvesting the successive plants in the row by gripping the plant top and extracting the plant from the soil and thereafter transporting the harvested plant along a prescribed path to a plant releasing zone where the harvested plants are released from the harvesting means,
said harvesting means including a pair of axially closely spaced substantially continuous circular rows of gripping sections relatively movable locally toward one another to closed plant gripping positions and away from one another to open plant releasing positions and which rotate with the wheel through the plant receiving zone and the plant releasing zone, and plant treatment means comprising a thermally insulated shroud forming a tunnel along said path through which the harvested plants are transported by said harvesting means, and means within said tunnel for spraying a cold liquid against the plants to chill the latter.

18. A machine for harvesting root row crops in the form of plants having tops exposed above the ground, said harvesting machine comprising:

a vehicle movable along the plant rows, harvesting means on said vehicle movable with the vehicle along at least one plant row for harvesting the successive plants in the row by gripping the plant top and extracting the plant from the soil and thereafter transporting the harvested plant along a prescribed path to a plant releasing zone where the harvested plants are released from the harvesting means, said harvesting means comprising a harvesting wheel rotatably mounted on said vehicle in a normally generally vertical longitudinal plane of the vehicle, means for effecting rotation of said wheel in timed relation to movement of said vehicle along the plant rows, a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, and means for effecting local opening and closing movement of said gripping means as said wheel turns in a manner such that said gripping means rotate through said receiving zone in open position to receive plant tops between the gripping means and then close upon entering said transfer zone to grip the intervening plant tops, extract the gripped plants from the soil, and transport the extracted plants through said transfer zone to said plant releasing zone, and said gripping means reopen upon entering said releasing zone to release the extracted plants from said wheel, and plant treatment means mounted on said vehicle along said path for performing at least one operation on the successive plants, said plant treatment means comprises a curved shroud about said wheel forming a tunnel having an open side through which projects the portion of the wheel perimeter in said transfer zone, whereby plants extracted from the soil by said wheel are transported through said tunnel to said transfer zone, plant washing means within said tunnel for spraying a washing liquid such as water on the plants to wash the plants as they move through said tunnel, and plant chilling means within said tunnel following said washing means for spraying a cold liquid one said plants to chill the plants as they move through said tunnel.

19. A harvesting machine according to claim 18 wherein:

said wheel has a central hub, said gripping means comprise flexible radial spokes fixed at their inner ends to said hub, two circular rows of plant top gripping elements mounted on the outer ends of said spokes for independent movement of the opposing gripping elements by flexing of said spokes toward one another to closed plant top gripping positions and away from one another to plant releasing positions, said means for effecting opening and closing movement of said gripping means comprises means for effecting closing movement of the opposing gripping elements toward one another in succession as said gripping elements rotate from said receiving zone to said transfer zone and opening movement of the opposing gripping elements away from one another in succession as said gripping elements rotate from said transfer zone to said plant releasing zone, and said gripping elements and the outer ends of said spokes within said transfer zone project into said tunnel through the open side thereof and effectively close said open side.

20. A machine for harvesting root row crops comprising plants having tops exposed above the ground, said harvesting machine comprising:

a vehicle movable along the plant rows, a harvesting wheel rotatably mounted on said vehicle in a normally generally vertical longitudinal plane of the wheel for movement with the vehicle along an individual plant row, means for effecting rotation of said wheel in timed relation to movement of said vehicle along the plant rows, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprise two circular rows of opposing plant top gripping elements which are independently movable in closing movement toward one another and opening movement away from one another, means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, said means for effecting opening and closing movement of said gripping means comprises means for effecting closing movement of the opposing gripping elements toward one another in succession as said gripping elements rotate from said receiving zone to said transfer zone and opening movement of the opposing gripping elements away from one another in succession as said gripping elements rotate from said transfer zone to said plant releasing zone, said means for effecting opening and closing movement of said gripping elements comprising spring means for yieldably biasing said gripping elements in one direction of their opening and closing movement and cam means for moving said gripping elements in the opposite direction, said spring means comprising spring fingers fixed to said wheel at one end and mounting said gripping element at the other end and stressed to urge said gripping elements in said one direction of their opening and closing movement, said cam means being engageable with said fingers in succession as said wheel turns for moving said gripping elements in said opposite direction, and a pair of air tubes extending through said plant receiving zone below said wheel in spaced relation transverse to the plane of the wheel, whereby the tops of plants in the plant row being harvested enter between said air tubes substantially concurrently with entrance of said plant tops between said plant gripping means within said plant receiving zone of the wheel, and upwardly directed nozzles on said air tubes for directing air upwardly against the intervening plant tops to blow the plant leaves upwardly and thereby condition the plant tops to be gripped by said gripping means.

21. A machine for harvesting root row crops comprising plants having leafy tops exposed above the ground and edible root portions, said harvesting machine comprising:

a vehicle movable along the plant rows, a harvesting wheel rotatably mounted on said vehicle in a normally generally vertical longitudinal plane of the wheel for movement with the vehicle along an individual plant row, means for effecting rotation of said wheel in timed relation to movement of said vehicle along the plant rows, said wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, means for effecting local opening and closing movement of said gripping means as said wheel turns in a manner such that said gripping means rotate through said receiving zone in open position to receive said plant tops between the gripping means and then close upon entering said transfer zone to grip the intervening plant top, extract the gripped plant from the soil, and transfer the extracted plants through said transfer zone to said plant releasing zone, and said gripping means reopen upon entering said releasing zone to release the extracted plants from said wheel, and a tubular chute generally tangential to the harvesting wheel at said plant releasing zone of said wheel into which said edible plant portions enter immediately following release of the plants from said wheel at said plant releasing zone, and plant trimming blade means at the entrance end of said chute for trimming said leafy tops from the plants entering said chute.

22. A machine for harvesting root row crops in the form of plants having tops exposed above the ground, said harvesting machine comprising:

a vehicle movable along the plant rows, a plurality of coaxial harvesting wheels rotatably mounted side by side in immediately adjacent relation on said vehicle in normally generally vertical longitudinal planes of the vehicle for movement of the wheels with the vehicle along a plurality of adjacent plant rows, means for effecting rotation of said wheels in timed relation to movement of said vehicle along the plant rows, each wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, and means linking a plurality of such gripping means on each wheel in a continuous belt to provide a continuous sequence of movements of such means on adjacent wheels toward and away from one another, and means for effecting local opening and closing movement of said gripping means of each harvesting wheel as said wheel turns in a manner such that said gripping means of each wheel rotate through said receiving zone in open position to receive plant tops between the gripping means and then close upon entering said transfer zone to grip the intervening plant tops, extract the gripped plants from the soil, and transport the extracted plants through said transfer zone to said plant releasing zone, and said gripping means of each wheel reopen upon entering said releasing zone to release the extracted plants from the respective wheel.

23. A harvesting wheel for a harvesting machine of the character described comprising:

a hub, a pair of annular, axially confronting plant gripping means concentrically surrounding said hub radially outward therefrom, said gripping means comprising two continuous circular rows of immediately adjacent opposing plant top gripping elements which are independently movable toward one another to closed plant gripping positions and away from one another to open plant releasing positions, and link means interconnecting adjacent gripping elements of each of said rows to form a continuous belt to provide a continuous sequence of such independent closing and opening movement of the gripping elements, and means mounting said plant gripping means on said hub for local relative movement of said plant gripping means toward one another to closed plant gripping positions and away from one another to open plant releasing positions in such a way that different circumferential portions of said plant gripping means are independently movable to said closed plant gripping positions and said open plant releasing positions, said means mounting said gripping means on said hub comprising resilient spokes fixed at their inner ends to said hub and at their outer ends to said gripping elements, respectively.

24. A harvesting wheel for a harvesting machine of the character described comprising:
a hub,
a pair of annular axially confronting plant gripping means concentrically surrounding said hub radially outward therefrom,
said gripping means comprising two circular rows of opposing plant top gripping elements which are independently movable toward one another to closed plant gripping positions and away from one another to open plant releasing positions, and links pivotally connecting the adjacent spokes in such a way as to permit said independent opening and closing movement of said gripping elements, and
means mounting said plant gripping means on said hub for local relative movement of said plant gripping means toward one another to closed plant gripping positions and away from one another to open plant releasing positions in such a way that different circumferential portions of said plant gripping means are independently movable to said closed plant gripping positions and said open plant releasing positions,
said means mounting said gripping means on said hub comprising resilient spokes fixed at their inner ends to said hub and at their outer ends to said gripping elements, respectively.

25. A harvesting wheel according to claim 24 wherein:
said links include radially inner links pivotally connecting the adjacent spokes intermediate their ends and radially outer links pivotally connecting the outer ends of adjacent links.

26. A harvesting wheel according to claim 25 wherein:
each of said radially inner and outer links include radially inner and outer rows of links spaced lengthwise of said spokes, and
rollers mounted on said spokes between each respective inner and outer link rows.

27. A harvesting wheel for a harvesting machine of the character described comprising:
a hub,
a pair of annular, axially confronting plant gripping means concentrically surrounding said hub radially outward therefrom,
said gripping means comprise two continuous circular rows of opposing plant top gripping pads with the pads in each row disposed side by side in close proximity to one another so as to form essentially a continuous annular row and wherein the opposing gripping pads are independently movable toward one another to close plant gripping positions and away from one another to open plant releasing positions, and link means interconnecting adjacent gripping elements of each of said rows to form a continuous belt to provide a continuous sequence of such independent closing and opening movement of the gripping elements, and
means mounting said plant gripping means on said hub for local relative movement of said plant gripping means toward one another to closed plant gripping positions and away from one another to open plant releasing positions in such a way that different circumferential portions of said plant gripping means are independently movable to said closed plant gripping positions and said open plant releasing positions,
said mounting means for said gripping means comprise flexible radial spokes fixed at their inner ends to said hub and at their outer ends to said gripping pads in such a way as to permit said independent movement of the pads to their open and closed positions.

28. A machine for harvesting root row crops comprising plants having tops exposed above the ground, said harvesting machine comprising:
a harvesting wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone,
said gripping means comprise two continuous circular rows of immediately adjacent opposing plant top gripping elements which are independently movable in closing movement toward one another and opening movement away from one another, and link means interconnecting adjacent gripping elements of each of said rows to form a continuous belt to provide a continuous sequence of such independent closing and opening movement of the gripping elements, and
said means for effecting opening and closing movement of said gripping means comprises means for effecting closing movement of the opposing gripping elements toward one another in succession as said gripping elements rotate from said receiving zone to said transfer zone and opening movement of the opposing gripping elements away from one another in sucession as said gripping elements rotate from said transfer zone to said plant releasing zone,
said means for effecting opening and closing movement of said gripping elements comprise spring means for yieldably biasing said gripping elements in one direction of their opening and closing movement and cam means for moving said gripping elements in the opposite direction,
said spring means comprise spring fingers fixed to said wheel at one end and mounted said gripping element at the other end and stressed to urge said gripping elements in said one direction of their opening and closing movement, and
said cam means are engageable with said fingers in succession as said wheel turns for moving said gripping elements in said opposite direction.

29. A machine for harvesting root row crops comprising plants having tops exposed above the ground, said harvesting machine comprising:
a harvesting wheel having a central hub and including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprise two circular rows of opposing plant top gripping elements which are independently movable in closing movement toward one another and opening movement away from one another, said means for effecting opening and closing movement of said gripping means comprises means for effecting closing movement of the opposing gripping elements toward one another in succession as said gripping elements rotate from said receiving zone to said transfer zone and opening movement of the opposing gripping elements away from one another in succession as said gripping elements rotate from said transfer zone to said plant releasing zone, said means for effecting opening and closing movement of said gripping elements comprise spring means for yieldably biasing said gripping elements in one direction of their opening and closing movement and cam means for moving said gripping elements in the opposite direction, said spring means comprise spring fingers fixed to said wheel at one end and mounting said gripping element at the other end and stressed to urge said gripping elements in said one direction of their opening and closing movement, said spring fingers comprising radial spokes fixed at their inner ends to a hub of said harvesting wheel and mounting said gripping elements at their outer ends, said spokes being stressed to urge the opposing gripping elements toward one another to their closed position, and said cam means are engageable with said fingers in succession as said wheel turns for moving said gripping elements in said opposite direction, said cam means being disposed between the spokes for the two rows of gripping elements for retaining said gripping elements in their open positions within said plant releasing and plant receiving zones.

30. The combination according to claim 29 wherein: said cam means comprises a relatively fixed cam for retaining said gripping elements in their open positions within said receiving zone, a relatively movable cam for retaining said gripping elements in their open positions within said plant releasing zone, and means for oscillating said movable cam circumferentially of said wheel.

31. The combination according to claim 30 wherein: said fixed cam comprises a cylindrically curved band concentric with the wheel and extending from the trailing end of said releasing zone through said receiving zone, and said movable cam comprises a cylindrically curved band concentric with said wheel and extending through said releasing zone into circumferentially overlapping relation to said fixed cam band, and said spokes mount cam followers engageable with the longitudinal edges of said cam bands.

32. A machine for harvesting root row crops comprising plants having tops exposed above the ground, said harvesting machine comprising:

a harvesting wheel including a pair of axially confronting plant gripping means about the wheel perimeter which are relatively movable locally toward one another to closed plant gripping positions and away from one another to open plant releasing positions and which rotate with the wheel through a plant receiving zone at the bottom of the wheel, then upwardly through a transfer zone to and finally through an upper plant releasing zone back to said receiving zone, said gripping means comprise two circular rows of opposing plant top gripping elements about the perimeter of said wheel, radial fingers mounting said gripping elements on said wheel for independent closing movement of the opposing gripping elements toward one another to closed plant gripping positions and independent opening movement of the gripping elements away from one another to open plant releasing positions, and links pivotally connecting the adjacent fingers in such a way as to permit said independent opening and closing movement of said gripping elements, and means for effecting local opening and closing movement of said gripping means as said wheel turns in a manner such that said gripping means rotate through said receiving zone in open position then close upon entering said transfer zone, and thereafter reopen upon entering said releasing zone, said means for effecting opening and closing movement of said gripping means comprises means for effecting closing movement of the opposing gripping elements in succession as said gripping elements rotate from said receiving zone to said transfer zone and opening movement of the opposing gripping elements in succession as said gripping elements rotate from said transfer zone to said plant releasing zone.

33. The combination according to claim 32 wherein: said wheel has a central hub, said fingers comprise radial spokes fixed at their inner ends to said hub and at their outer ends to said gripping elements, respectively, and said links pivotally connect the adjacent spokes.

34. The combination according to claim 33 wherein: said spokes are resiliently flexible and stressed to bias said gripping elements toward one another to their closed positions, said means for effecting opening and closing movement of said gripping means comprises cam means located between the spokes for the two rows of gripping elements and engageable with said spokes at positions intermediate the inner and outer spoke ends for retaining said gripping elements in their open positions within said receiving and releasing zones, and said links included radially inner links pivotally connecting the adjacent spokes close to said intermediate spoke positions and radially outer links pivotally connecting the outer ends of adjacent spokes.

* * * * *